(12) United States Patent
Randle et al.

(10) Patent No.: US 7,949,871 B2
(45) Date of Patent: May 24, 2011

(54) METHOD FOR CREATING VIRTUAL SERVICE CONNECTIONS TO PROVIDE A SECURE NETWORK

(76) Inventors: William M. Randle, Bexley, OH (US); Randall E. Orkis, Pataskala, OH (US)

( * ) Notice: Subject to any disclaimer, the term of this patent is extended or adjusted under 35 U.S.C. 154(b) by 933 days.

(21) Appl. No.: 11/382,351

(22) Filed: May 9, 2006

(65) Prior Publication Data
US 2006/0248205 A1 Nov. 2, 2006

Related U.S. Application Data

(63) Continuation-in-part of application No. 11/355,861, filed on Feb. 16, 2006, now Pat. No. 7,627,532, which is a continuation-in-part of application No. 11/337,394, filed on Jan. 23, 2006, now Pat. No. 7,546,276, which is a continuation-in-part of application No. 11/298,121, filed on Dec. 9, 2005, now abandoned, which is a continuation-in-part of application No. 10/459,694, filed on Jun. 11, 2003, now Pat. No. 7,568,222, which is a continuation-in-part of application No. 10/283,038, filed on Oct. 25, 2002, now Pat. No. 7,565,326.

(60) Provisional application No. 60/679,295, filed on May 9, 2005, provisional application No. 60/694,456, filed on Jun. 27, 2005.

(51) Int. Cl.
*H04L 29/06* (2006.01)
(52) U.S. Cl. .......................... 713/153; 713/150; 713/152
(58) Field of Classification Search .................. 713/168, 713/169
See application file for complete search history.

(56) References Cited

U.S. PATENT DOCUMENTS

| | | | | |
|---|---|---|---|---|
| 5,533,009 A * | 7/1996 | Chen | ............................ | 370/232 |
| 5,680,440 A * | 10/1997 | Ghisler et al. | ............. | 455/432.1 |
| 5,774,668 A * | 6/1998 | Choquier et al. | ............. | 709/223 |
| 5,974,133 A * | 10/1999 | Fleischer et al. | ............... | 379/230 |
| 5,978,113 A * | 11/1999 | Kight | ................................ | 398/1 |
| 6,078,586 A * | 6/2000 | Dugan et al. | ................ | 370/395.2 |
| 6,125,119 A * | 9/2000 | Cherukuri et al. | ............ | 370/410 |
| 6,631,416 B2 * | 10/2003 | Bendinelli et al. | ............ | 709/227 |

(Continued)

OTHER PUBLICATIONS

Excerpts from the decision in: In the matter, Wells Fargo Bank, N.A., Claimant, and Data Treasury Corporation and, WMR e-PIN LLC, e-Banc, LLC, and Synoran, AAA No. 65 117 00005 07 delivered on Jul. 21, 2008.

*Primary Examiner* — Kambiz Zand
*Assistant Examiner* — Dant B Shaifer Harriman
(74) *Attorney, Agent, or Firm* — Edwin M. Baranowski; Porter, Wright, Morris & Arthur, LLP

(57) ABSTRACT

A Secure Service Network (SSN) in which at least two participants having a relationship are connected to a physical network by way of Secure Service Gateways and share information defined by one or more Service Definitions allowing for the creation of a secure Virtual Service Connection (VSC) between the participants in which the VSC is specific to the activity being performed and the participants provisioned for that activity. SSN enables the creation of a secure virtual network topology on any network transport that allows participants to exchange documents and transact business over the network real time, where all activity inherits a business and security infrastructure that is independent and in addition to the applications, devices, web services, users using the network.

17 Claims, 30 Drawing Sheets

U.S. PATENT DOCUMENTS

| | | |
|---|---|---|
| 7,568,222 B2 | 7/2009 | Randle et al. |
| 2003/0200172 A1 | 10/2003 | Randle et al. |
| 2005/0071283 A1 | 3/2005 | Randle et al. |
| 2006/0015450 A1 | 1/2006 | Guck et al. |
| 2006/0053290 A1 | 3/2006 | Randle et al. |
| 2006/0107036 A1 | 5/2006 | Randle et al. |

* cited by examiner

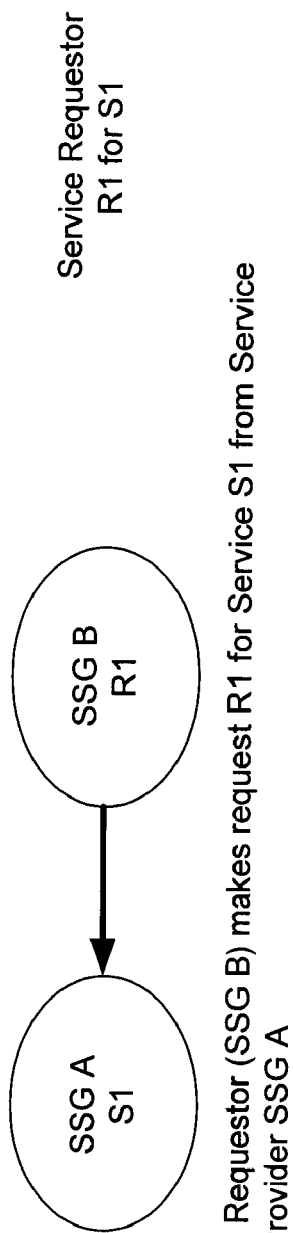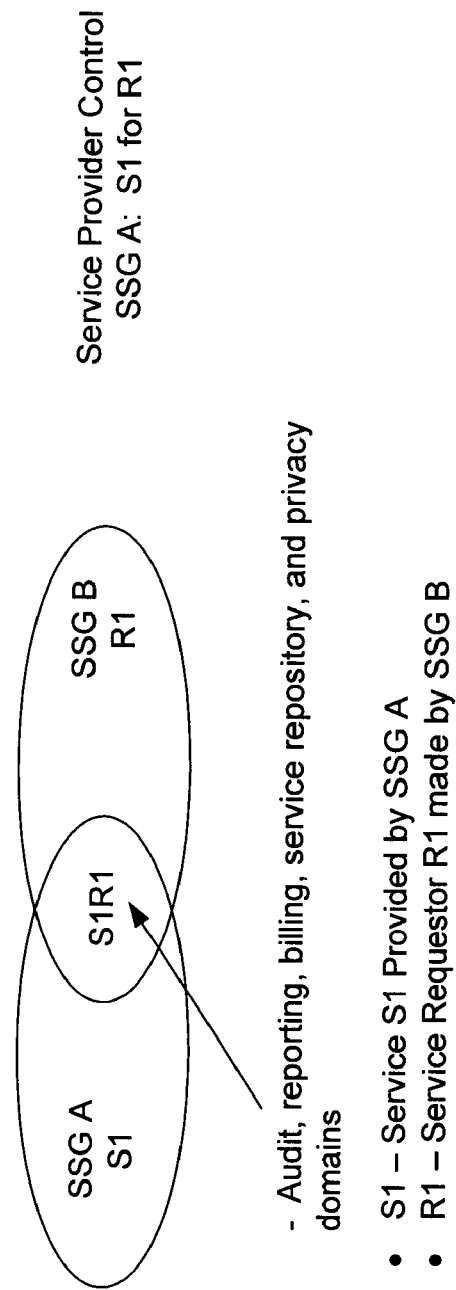
Figure 1, Relationship and Control Models

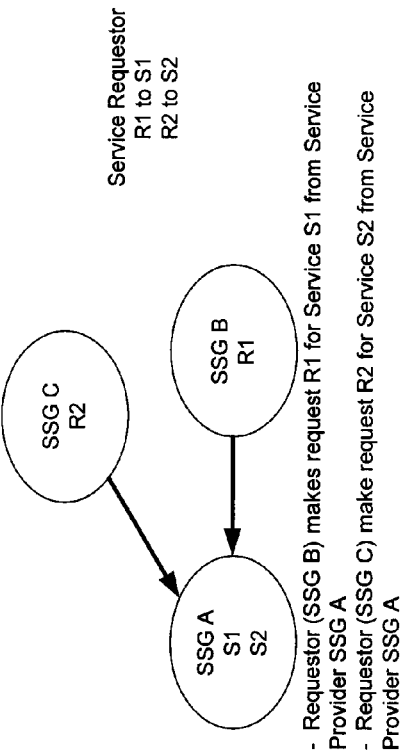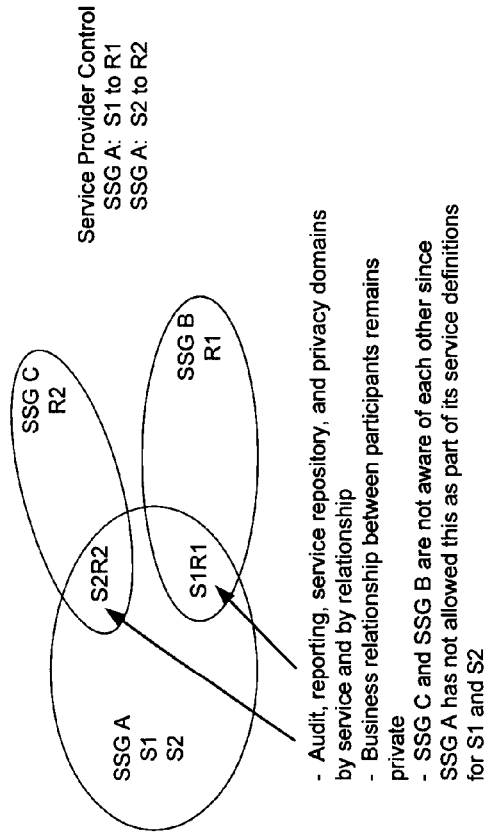
Figure 2

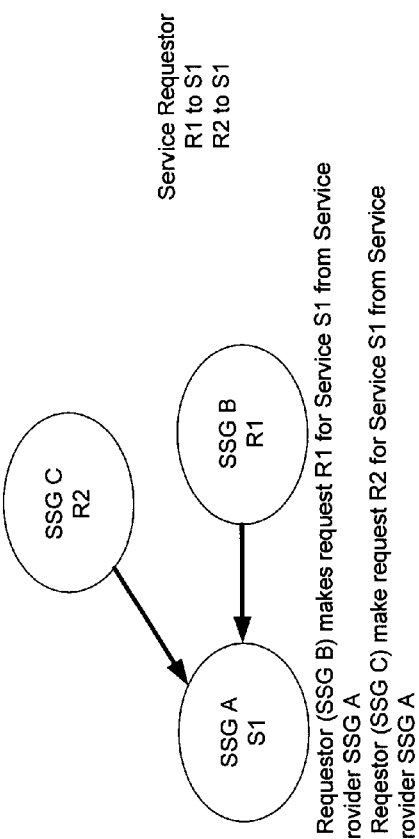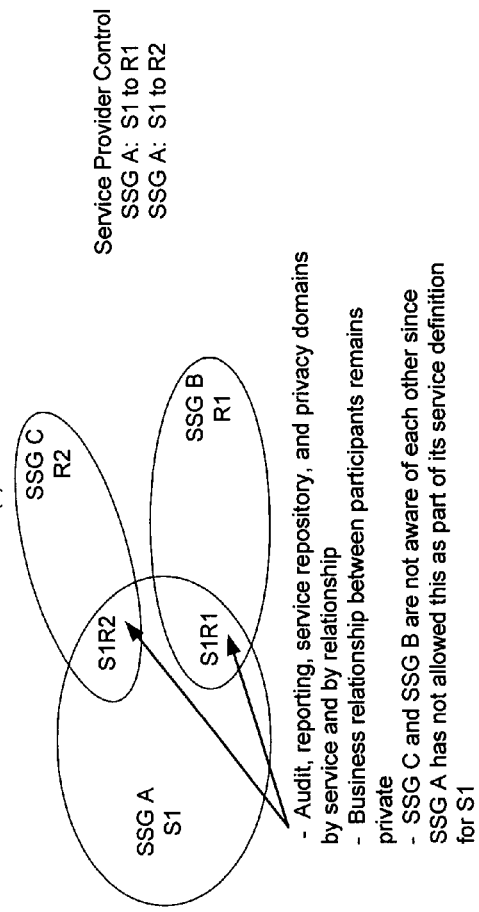
Figure 3

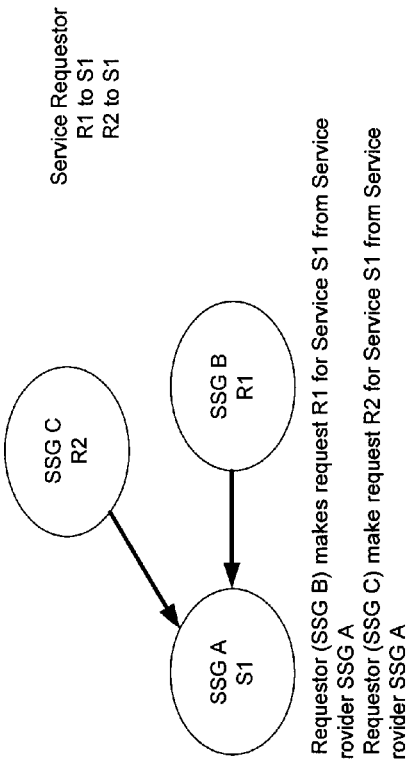
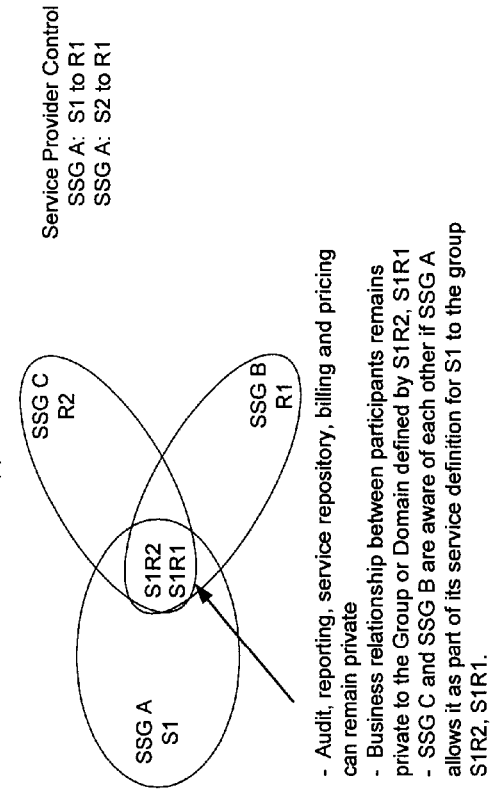
Figure 4

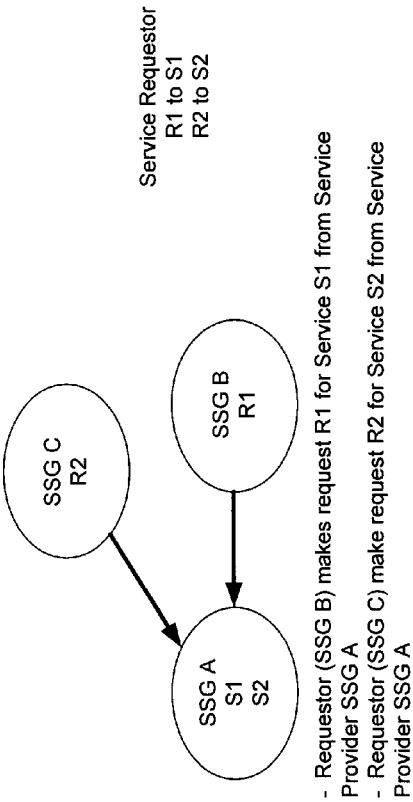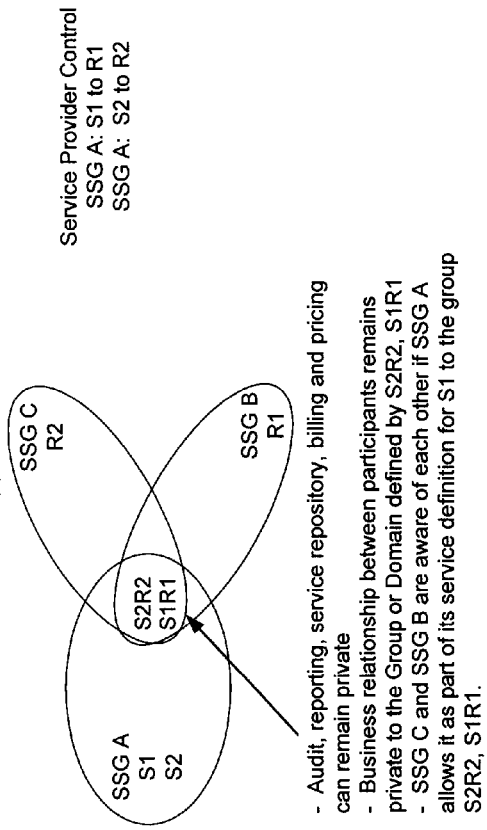
Figure 5

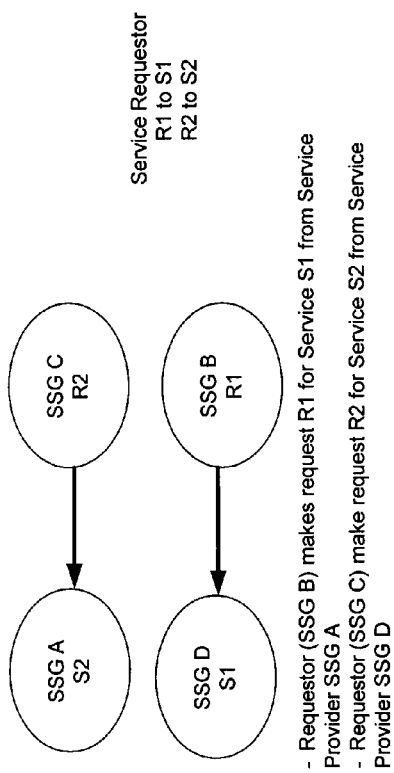
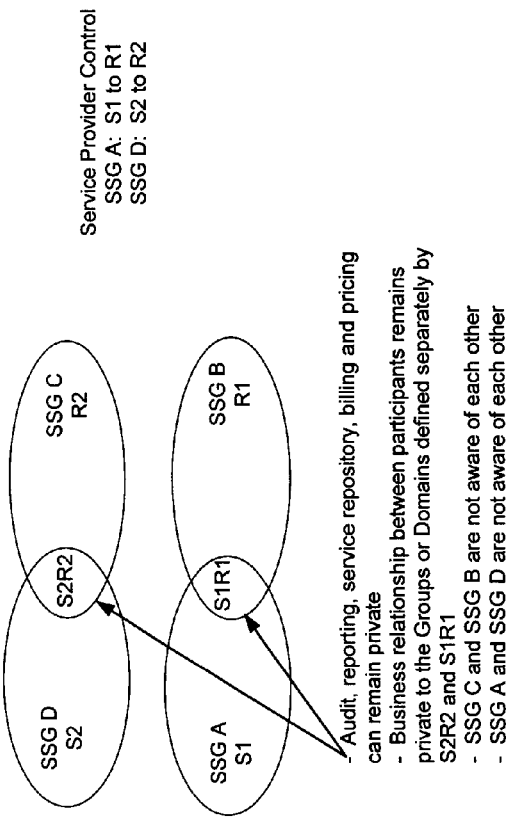
Figure 6

Figure 13: Multi-ACL Enforcement

SSN – Secure Service Network Stack – Web Service Example

- Services Infrastructure
  - Message Protocol Stack
  - Message Specification
  - Content
  - Processing Model
  - Routing
  - Exception Handling
  - Integrated Security and Management Functions

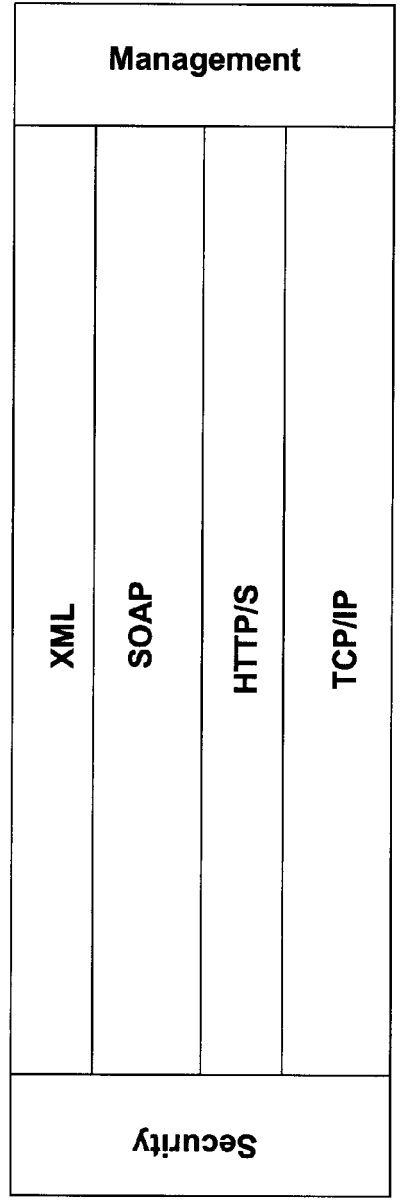

Figure 22

Protocol Stack – Messaging Architecture Employs Standard Web Services Protocol Stack Based on XML Messages in SOAP Over an HTTPS Transport

Sample Log Record

SSN Administrator
COMPANY A
Date/Time: 02/01/2005 09:05 EST

Log Record Detail

| | | | |
|---|---|---|---|
| Requesting Organization: | Company A | Request UID: | 98we7lvhLAEUFH912 |
| Providing Organization: | Company B | Originator UID: | Teller-term297 |
| Service: | Cash Letter Add | Correlation UID: | ALJSOFDU038UJLA |
| Response Code: | 200 | Local Infrastructure ID: | companyasp.synoran.mci |
| Response Reason: | OK | Remote Infrastructure ID: | companybsp.synoran.mci |
| Elapsed Time: | 200 | Originator Host: | companybint.synoran.mci |
| Request Message Size: | 2400 | Destination Host: | companyaint.synoran.mci |
| Response Message Size: | 2440 | Destination Port: | 8080 |
| Event Date / Time: | mm/dd/yyyy 99:99 XXX | | |
| Service URL: | CashLetterService/services/CashLetterServicePort | | |

Figure 24

SLA – Response Code

Figure 27

Billing / Chargeback Report

Figure 29

METHOD FOR CREATING VIRTUAL SERVICE CONNECTIONS TO PROVIDE A SECURE NETWORK

RELATED APPLICATIONS

This application is related to and claims all benefits under 35 U.S.C. §119(e) of our earlier United States Provisional Patent Applications Ser. No. 60/679,295 filed on May 9, 2005, entitled "A Carrier Independent Multipurpose Network with an Embedded Secure Services Layer that Establishes a Business and Security Infrastructure as an Integral Part of the Network." and Ser. No. 60/694,456 filed Jun. 27, 2005, entitled "Service Oriented Network Managed Service Infrastructure and Process Model for Secure Networked Communications With Peer to Peer Functionality". This present application is a continuation-in-part of copending applications Ser. No. 11/355,861 filed Feb. 16, 2006 now U.S. Pat. No. 7,627,532 entitled "Secure Digital Courier and Desktop Architecture for Secure Service Oriented Networking"; Ser. No. 11/337,394 filed Jan. 23, 2006, entitled "Common Authentication Service for Network Connected Applications, Devices, Users, and Web Services," now U.S. Pat. No. 7,546,276, issued Jun. 9, 2009; Ser. No. 11/298,121 filed Dec. 9, 2005 now abandoned, entitled "Secure Multi Function Network for Point of Sales Transactions"; Ser. No. 10/459,694 filed Jun. 11, 2003, entitled "Standardized Transmission and Exchange of Data With Security and Non-Repudiation Functions: now U.S. Pat. No. 7,568,222, issued Jul. 28, 2009;"; and Ser. No. 10/283,038 filed Oct. 25, 2002, entitled "Dialect Independent Multi Dimensional Integrator Using a Normalized Language Platform and Secure Controlled Access," now U.S. Pat. No. 7,565,326, issued Jun. 9. 2009.

FIELD OF THE INVENTION

The present invention relates generally to secure electronic information exchange using the Secure Service Network ("SSN") technology layered on top of a traditional network infrastructure. Using the SSN layer that allows for Virtual Service Connections ("VSCs"), all applications running over a network as well as the network transport for those applications inherits a holistic security and business reporting model resulting on a virtual service network topology that can be implemented and managed on any network transport. All activity on the network inherits a base secure business infrastructure that supports all of the elements needed to enter into and enforce a business contract. Activities on the network are defined in terms of a service definition and then implemented as VSCs that are specific to the activity and involved participants for that activity as defined by the activity owner and independent and isolated from any other participant on the network. This secure service layer implements a Virtual Service Network (VSN) infrastructure and process model where holistic security can include mutual authentication, authorization, encryption, privacy, and end to end logging private and specific to every VSC on the network. The SSN infrastructure can include a management facility enabling reporting, SLA enforcement, and the ability for anyone on the network to securely publish, provision, and charge for services independent of any other participant on the network. The invention enables the creation of vast secure virtual network communities independent of carrier or physical network path where a prerequisite to establishing a network connection is authentication, encryption, and authorization that is specific to a service provisioned to one or more participants on the network.

The invention is unique in that it addresses the security gap created by the market separation between network providers and application providers. It accomplishes this by establishing a secure virtual service layer on any physical network transport that makes the network transport secure for any attached networked application where the application and transport inherit a common security and business reporting model for all SSN defined communications. The result is the seamless integration of the lower network layers with the upper network layers, establishing holistic security and business reporting as embedded elements of the network. This unique approach eliminates many problems created by the traditional separation between lower layers 1-3 of the Open Systems Interconnect ("OSI") stack which is traditionally delegated to the network transport providers and delivering a private secure network, and the upper layers 4-7 of the OSI stack that is traditionally delegated to software applications and elements around application security. By addressing this traditional separation in responsibility, and embedding a common consistent solution in the network, a highly secure multifunction, multi-application, multi-user environment can be cost effectively achieved, managed, and expanded upon to support mission critical business relationships through the features of the invention. No such solution or process model exists today that combines the features of embedded security, business reporting, low lost, flexibility, and governance that can be achieved with the invention. The solution supports any network protocol that is TCP friendly including streaming protocols and also provides a method to secure the provisioning and use of web services over any network transport. The solution of the invention enables the creation of secure virtual network communities on any physical network where comprehensive end to end security and business reporting are functions of the network and inclusive to all network traffic managed by the solution.

BACKGROUND OF THE INVENTION

Much like the railroads in the early $19^{th}$ century, networks have become the life blood of many of today's businesses and business models. The ability to affect efficient secure information exchange often determines the success or failure of a business proposition, deal, or sale. The technology of the internet has demonstrated the power of not only sharing information, but the impact that it can have on entire business ecosystems when the information is available in a low cost distribution model, that includes the power for network participants to securely publish items for consumption to a broad network community. This secure publication capability is a key differentiator and business driver. We have all seen the impact of the Internet, which is arguably the largest IP network in the world. The combination of low cost of entry, ambiguous connectivity, and the power it places in the hands of the end user, the internet has had an impact on nearly every industry and business ecosystem.

However, as with all good things, there are drawbacks and networked communications is no exception. As the dependency on networks has become greater so has the impact of outages, security breaches, malicious activities, and cost of support. In fact, as the value of information increases so does the interest in criminal activity. As a result, the Internet anarchy that persists today has all but eliminated it as a useful mechanism for mission critical business activities. This anarchy is largely the result of a lack of a business reporting infrastructure, and the lack of a consistent implementation for comprehensive end to end security that at a minimum includes integrated authentication, authorization, encryption, and end to end logging.

In today's networked world, companies have leveraged Internet technology to create vast private IP networks that rely on IP addressing and filtering for perimeter security. Not long ago, as the number of users was relatively small, it was not difficult to secure a private IP network using traditional routers, firewalls, and switches to form a perimeter security barrier. However, with the proliferation of users and devices to the tens of thousands and over a world wide geographical footprint, companies and network providers find themselves faced with a security nightmare that has a fatal characteristic. That fatal characteristic is the fact that as the number of participants grows there is a parallel relationship between cost and risk, where cost goes up with risk, and risk goes up with the number of participants, number of functions/applications on the network.

The reason for this nightmare is the result of a few basic characteristics in how networks are created and managed. The first is the fact that by default they employ an optimistic security model. One in which the default is to "allow-all" and "then restrict" or take privileges away through perimeter security. The second is the fragmented implementation of security across the network and applications. Some approaches rely on a private network, other rely on application connected to the network, and most rely on an inconsistent mix of both.

The technology and market has evolved with two distinct segments. One is around networking and traditional perimeter security, and the other is around applications and business functionality. The result is that there is a significant separation and variations in implementation of critical components of security across the layers of the OSI stack with no consistent integration for security and business reporting. The internet has done a great job of standardizing network connectivity, but does not address comprehensive security or business reporting. Everyone does it in their unique way and/or relies on the other for security. The result is businesses are driven to private application or function specific networks in order to guarantee security and control.

The result today is that networked application security is dependent on several critical elements that are not consistently implemented or managed as an aggregated solution or system for a shared participant environment. Today, assuming a multifunction networked solution, security is only as good as the worst combination (weakest link) of implementation approaches whether it be in one of many applications or in any elements of the perimeter security around the network or one of its segments. At the lower traditional network levels your network is only as secure your weakest network on-ramp and once someone is on the network there is a very limited capability to know who they are or what they are doing.

Current approaches to addressing these issues are focused on more complex versions of the same approaches. Users are forced to implement private dedicated networks that are application or function specific, point to point, and managed as islands of secure network infrastructure where a key element of the security approach is to limit activity or users through single or centralized control. These approaches are costly and severely limit participants on the network as well as networked applications. Examples include the many private and function specific networks in banking today (Visa, ACH, ATM, Fed Wire, etc.,) the traditional EDI implementations where point to point connections are used for EDI transmission between two parties, and the many networks used in the securities, insurance, medical, legal, and educational business verticals that perform limited functions and have a restricted participant base.

The artifacts needed to support a basic business relationship and enforce a business contract for reliable mission critical network business includes many security elements. They include but are not limited to: (1) authentication—I know who I am doing business with; (2) authorization—know who you are and can enforce that you are authorized to do what you are attempting to do and nothing else; (3) privacy—I can keep private a participant's activity or existence from others that are not authorized to have knowledge of that activity or existence; (4) end to end audit—I can track all activity to the user and activity level and provide a record of the activity (who did what to whom and when); (5) reporting—I collect and report on data in a manner needed to support SLA enforcement, billing, dispute resolution, activity and operational planning; (6) non-repudiation—I can support that an activity happened and that it is unique to the participants. Information such that I can assure one's inability to deny the integrity and authenticity of an action or activity; (7) end to end encryption—I can protect the information being exchanged such that it is only viewable to the authorized participants.

Today there are many pieces of technology available to implement each of these artifacts, but, there is no integrated solution offering that allows the implementation, management, provisioning, and business reporting on these elements as a function of a virtual network connection and/or a virtual network topology.

An alternate approach would be to enforce all security within the applications attached to the network. This works fine in a closed environment where the applications can be controlled. However in a mixed user/application environment the result is that your security is only as good as your weakest application. One common limitation of this approach involves the method of authentication when the network is public and not restricted to a limited set of users. A common problem in the case of a simple user ID and password configuration for an application over a multi-user network like the internet is that there is no strong method for authenticating the user and the provider. If the user ID and password is compromised one has no way of telling the real user from a fraudulent one. This is the case with the many phishing scams seen on the Internet today. By including mutual authentication or multi factor authentication with the other elements described above one can solve this problem for all networked applications and/or devices and users. Today there is no solution that implements comprehensive security as a prerequisite to establishing a network initiated activity that is transparent to the application(s) using the Network.

The result is that currently there is no method to accomplish all of these security elements where they are implemented and enforced in a consistent manner independent of the network transport provider and/or applications attached to the network where each participant can maintain secure control of their services independent of others on the network.

A need exists for a network solution that addresses the shortcomings in the current commonly accepted implementation models for security for applications that run over any OSI based network infrastructure at both the network and application layers.

A need exists where all of the critical elements needed to support a basic business contract are embedded elements of the network. These embedded elements of the network address the flaws discussed previously by applying an infrastructure layer that is based on absolute security, not optimistic security, and provides a minimum consistent implementation for all participants, applications, and activities on the network.

By integrating comprehensive security and reporting elements across the OSI stack into a virtual secure network offering one can arrive at a low cost, secure, multifunction, broad reach network solution that addresses all of the elements needed to support a basic business contract on a shared multifunction network infrastructure that is currently not attainable with today's approaches.

SUMMARY OF INVENTION

The present invention comprises a solution architecture and process framework that establishes a secure services virtual network topology on any network transport independent of carrier provider where a comprehensive security and business reporting model is established and applied as a minimum for all participant activity on the network. The present invention establishes a technology and process model that addresses the traditional separation between the interpretation and implementation of lower layers (commonly referred to as network or transport layers) of the OSI stack and upper layers (commonly referred to as the application layers) of the OSI stack. The invention addresses the separation and inherent flaws in the classic network perimeter model and mixed application model by implementing end to end comprehensive security as a function of a secure virtual network connection. The invention does this in a fashion that is transparent to the applications/web services running over the network and the underlying transport, but is complimentary to any security in the application/web service or in the network transport.

By establishing a layer on top of the traditional network transport that integrates a comprehensive security and management reporting capability the solution can assure that all network activity meets a minimum security and business reporting model. Depending on the application or web service this may be accomplished without requiring changes to any application or web service provisioned by the solution of the invention. Applications/web services connected to the invention utilize this layer for secure communication over any network transport by way of a Virtual Service Connection ("VSC") created and managed by the invention. All traffic inherits a base security model enforced by VSCs. Multiple VSCs are created as needed to create a Virtual Service Network ("VSN") on top of any transport. This allows for the creation and management of secure VSN and/or multiple VSN communities. VSCs are defined and created through service definitions in the invention and can vary in granularity based on a service providers need.

Unlike a VPN, where the result is an extension of network privileges and perimeter security where all traffic runs down the same virtual network connection, each service on SSN runs down its own isolated and dedicated VSC where there may be one or more connections per node (SSG) or user on SSN. The ability of a node or participant to support multiple secure virtual connections on the network in a unique feature of the solution. In one implementation, multiple VSCs are supported where each VSC includes mutual authentication, service specific authorization (function, application, web service, etc.,) transport encryption, and end to end reporting for each and every service and specific to the provisioning of that service to one or more users. Optionally payload encryption and digital signing of the payload is supported which can be specific to the provisioning of the service to one or more participants in that service. A VSC is specific to a service definition and the one or more participants a service is provisioned to. A discrete and private VSC is created for each service relationship as defined by a service provider on an instance of SSN assuring absolute end to end security, privacy, and reporting independent and isolated from all other virtual or physical network traffic.

The invention implements a secure VSN topology on any network transport where one or more management facilities are used to define, implement and manage VSCs through service definitions. As described herein and in previous art, this VSN topology is a virtual network implementation that includes Secure Service Gateways as management points and/or entry points on the VSN. VSN participants establish a trust relationship with other VSN network elements. As a result, activity on the VSN is managed and enforced in a consistent but participant driven model. In this manner the solution embeds security, audit and reporting in the network where all service traffic on the network inherits this base infrastructure capability.

The benefits of the invention include all of the elements around secure and auditable information exchange discussed herein as well as the ability to deliver high value secure services over any network transport in one or more governance models. This solution alleviates the need for a dedicated network drop for every network participant, business partner type, or high value application or business function and addresses the fragmented security issues inherent to current approaches. The network drop is replaced by a VSC which is a private virtual connection between one or more participants specific to the participants and the service where comprehensive security and reporting is implemented consistently and specific to that VSC. The invention allows service providers to provide any number of isolated VSCs over any shared network transport including the internet, private networks, wired and wireless connections. In addition service providers can broker services (VSCs) to other participants while maintaining security and privacy with business reporting.

Using the solution as a managed service, a network carrier can provide a broad range of applications, web services, business functions, and activities on the network where there is physical network connectivity while allowing the managed service to be independent of other carriers. In this manner one carrier can gain an advantage over another in a mixed carrier environment by establishing a managed service offering on the other carrier's network transport. The same advantage applies to a network equipment provider. The solution enables VSCs and VSNs independent of the hardware implementing the traditional network transport and lower level network addressing and routing scheme. As a result a network equipment provider that includes the solution in their equipment has the ability to establish VSNs and VSCs on a mixed equipment network which reduces the value of a competitor's equipment while enhancing the value of their equipment.

With SSN a VSC is created specific to the activity and participants for that activity that is open for the duration of the activity and then disposed of. The VSC can be tied to a Service Definition where a Service Definition can be tied to business functions, applications, web services, admin functions, reporting functions, and the like. For example, a service definition may be a web services, can be a VSC specific to an existing web enabled application, can be a web service linked to a legacy application, business function, or business process, can be a web service linked to another web service and the like. In this manner the invention allows for the integration of many disparate systems into a secure comprehensive or simple service that can be universally and securely shared with anyone having access to SSN.

The invention supports the brokering of services by allowing for the creation of chains of trust, audit, and business reporting.

The invention supports a broad range of service definitions that can be used to address simple and complex legacy system integration as well as multiple levels of network and application integration. This includes carrier diverse environments as well as a seamless transition to and from trusted and untrusted network transports.

The invention is described more fully in the following description of the preferred embodiment considered in view of the drawings in which:

BRIEF DESCRIPTION OF THE DRAWINGS

FIG. 1 depicts an example of relationship and control models; case 1: base SSN relationship mode—simple requestor to service provider (disclosed by the inventors herein in one or more of their prior applications). Case 1: control model—domain(s) (embodiment of the invention FIG. 2 depicts an example of relationship and control models; case 2: relationship model: multi-user with privacy—multi services/multi-requestor complete privacy (disclosed by the inventors herein in one or more of their prior applications). Case 2: control model—domain(s) (embodiment of the invention).

FIG. 3 depicts an example of relationship and control models; case 3: relationship model: multi-user with privacy—single service/multi-requestor complete privacy (disclosed by the inventors herein in one or more of their prior applications). Case 3: control model—domain(s) (embodiment of the invention).

FIG. 4 depicts an example of relationship and control models; case 4: relationship model: multi-user with group privacy—single service/multi-requestor group privacy (disclosed by the inventors herein in one or more of their prior applications). Case 4 control model—domain(s) (embodiment of the invention).

FIG. 5 depicts an example of relationship and control models; case 5: relationship model: multi-user with group privacy—multi-service/multi-requestor group privacy (disclosed by the inventors herein in one or more of their prior applications). Case 5: control model—domain(s) (embodiment of the invention).

FIG. 6 depicts an example of relationship and control models; case 6: relationship model: multi-user with individual participant privacy—multi-service providers/multi-requestor (disclosed by the inventors herein in one or more of their prior applications). Case 6: control model—domain(s) (embodiment of the invention).

FIG. 22 depicts an embodiment of the invention showing SSN—secure service network stack in a web service example.

FIG. 24 is a screen shot of a sample log record (an embodiment of the invention).

Figure 27:
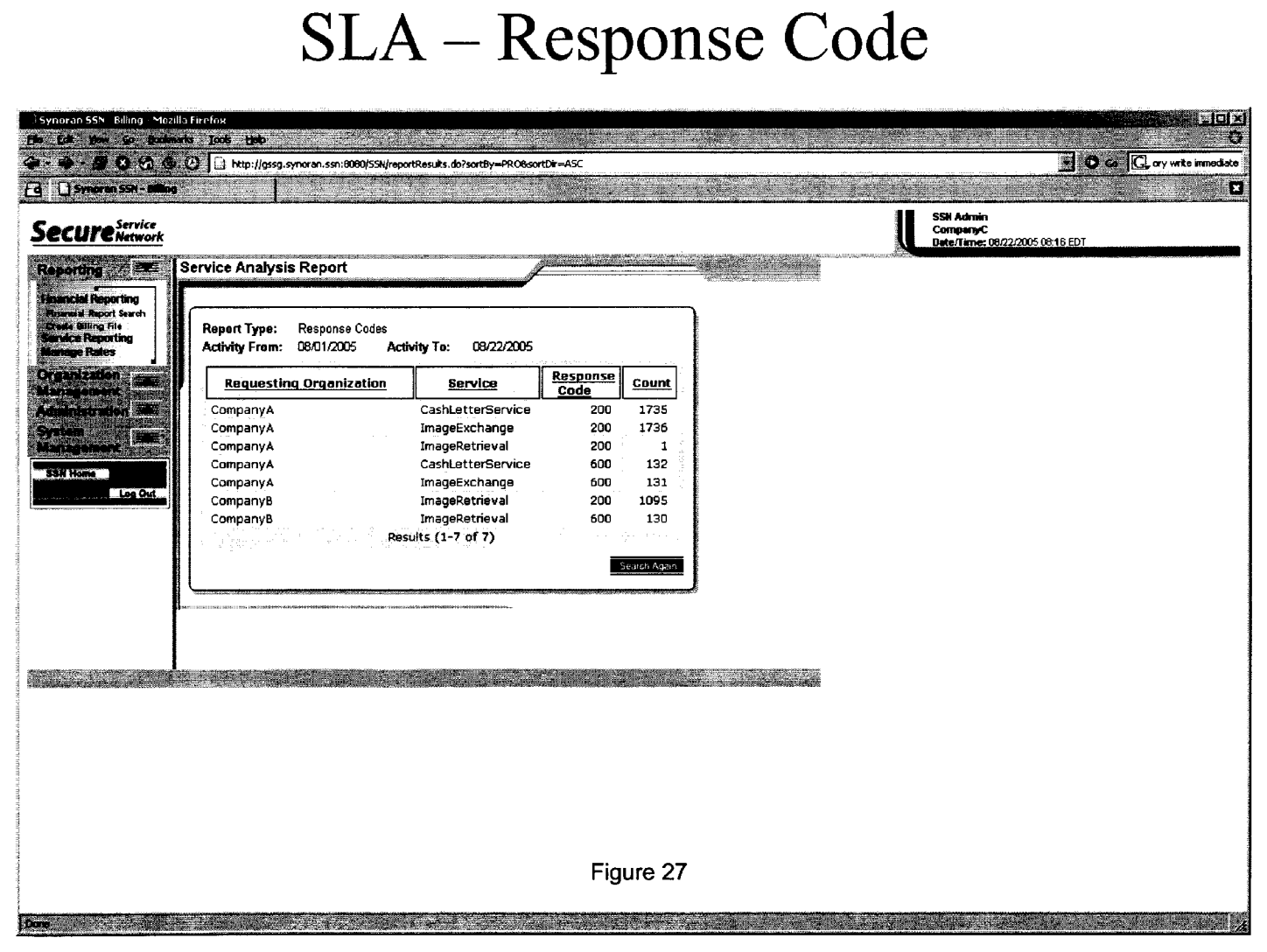

FIG. 27 is a screen shot of a SLA response code (an embodiment of the invention).

Figure 29:
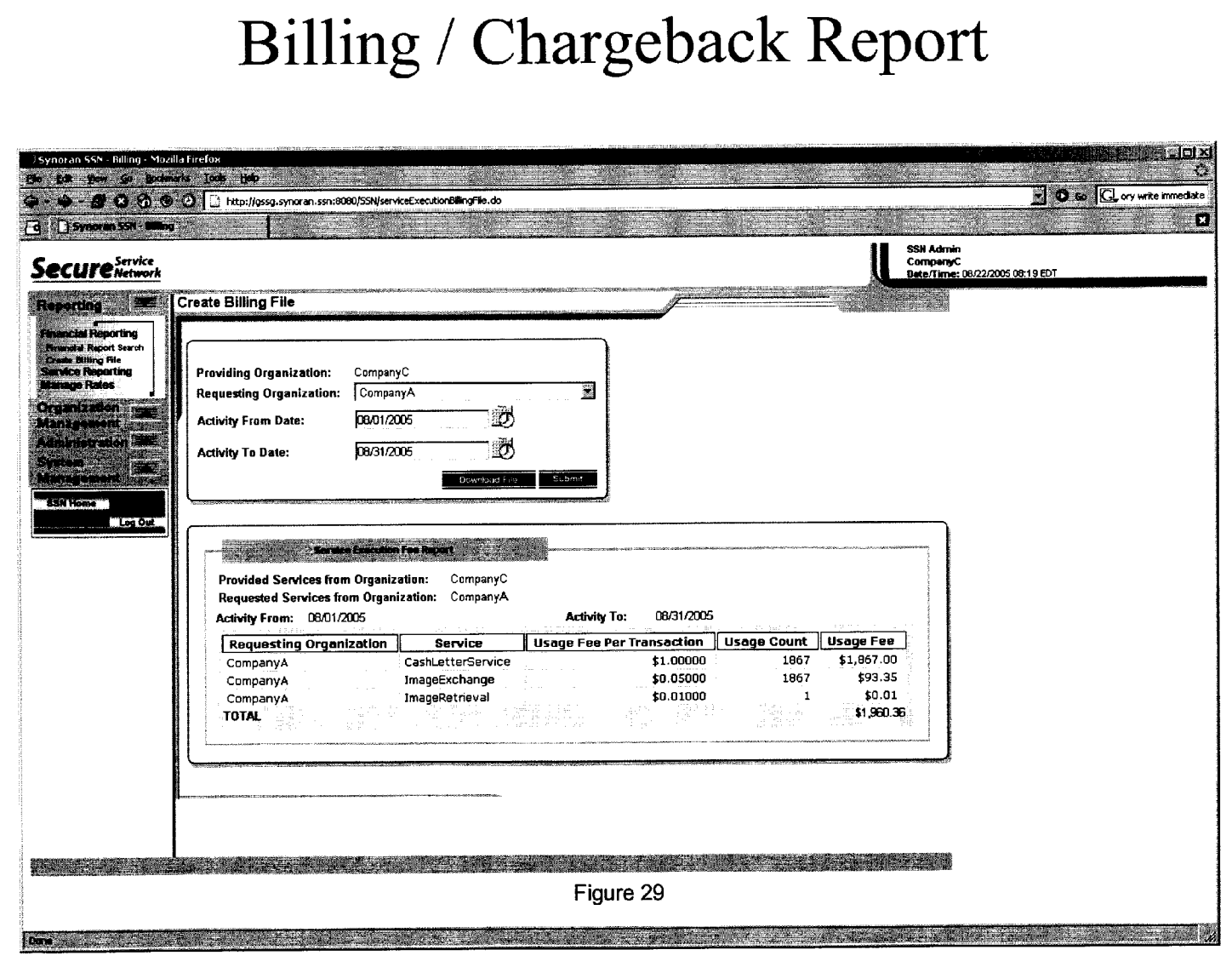

FIG. 29 is a screen shot of a billing/chargeback report (an embodiment of the invention).

DETAILED DESCRIPTION OF THE INVENTION

Figure 7:
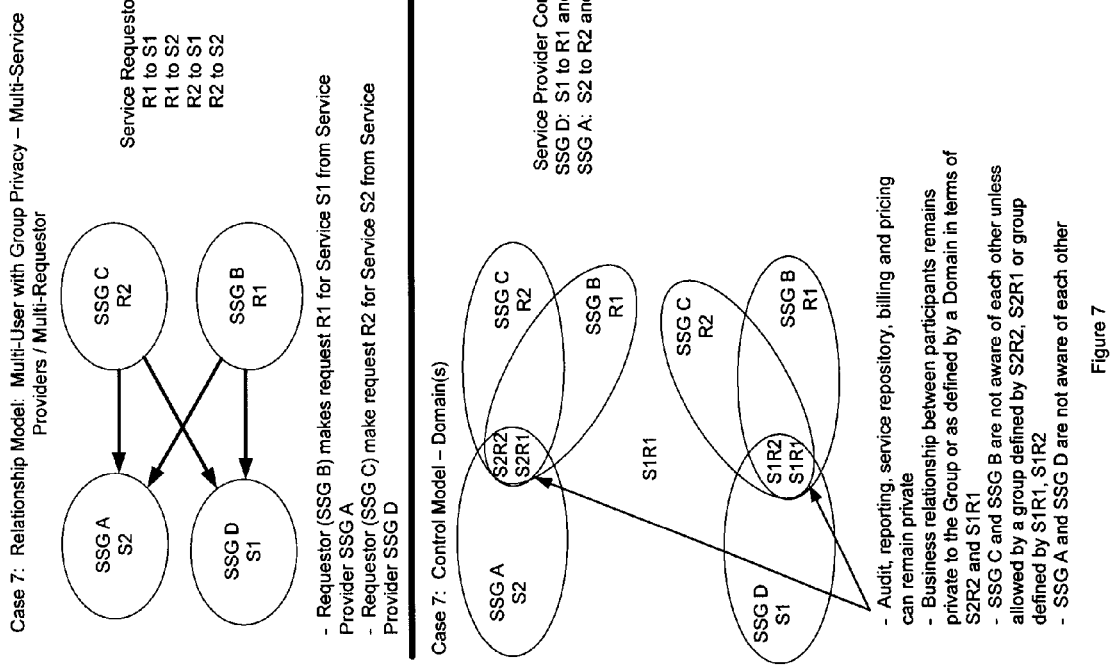
FIG. 7 depicts an example of relationship and control models; case 7: relationship model: multi-user with group privacy—multi-service providers/multi-requestor (disclosed by the inventors herein in one or more of their prior applications). Case 7: control model—domain(s) (embodiment of the invention).

The invention implements a trusted security model that can include the following elements: (1) Authentication—to include mutual bidirectional authentication. In this manner participants can guarantee who they are doing business with using a bi-lateral verification rather than the traditional one way verification. In addition, the solution can include two factor authentication, low cost embedded PKI and other public and private token; secret management schemes, and third party issuance methods and biometrics. With mutual authentication each participant can authenticate with each other using, as an example a PKI infrastructure mediated by a trusted third party; (2) Function specific device and user authorization. In combination with authentication, the authorization function can allow for the enforcement of business function specific activities. This can provide for device and user level roles and function specific authorization control for each activity where that activity is specific to an SSN implementation as a VSC. Following completion of the activity the network connection can be disposed of, which in some cases can enhance security. This is unique to SSN and has been termed a Virtual Service Connection (VSC) on a Virtual Service Network (VSN) or a VSN connection; (3) Non-repudiation—Information such that one can assure one's inability to deny the integrity and authenticity of an action or activity on the SSN. As part of this, SSN can support that an activity happened and that it is unique to the participants. This can include the use of digital signatures, payload signing, and recipient specific encryption using something like PKI; (4) End to end encryption—The ability to assure that the activity and the data being exchanged is only viewable to the authorized participants. This includes the ability to encrypt the communications link and the payload independent of each other. In addition, digital signatures and the like can be used to assure who the payload came from and that it was not tampered with; (5) End to end logging—an end to end audit trail that is unique to each and every activity and group of participants on the SSN. This can allow for real time operational reporting as well as long term audit, billing, and reporting. A unique UUID is created for each and every service invocation. In addition, a correlation ID can be used to establish and report on chains of trust implemented by the security embedded in the solution. A Origination ID is also supported that allows a unique identifier to be populated by the user system, device, or service; (6) End to end reporting—the ability to create and audit reports for each and every VSC activity on the network where real time and historical analysis can be conducted and reported on; (7) End to end privacy for all activities on the network—the ability to protect the identity and the business activity between a group of participants on the SSN where only participants authorized to see a particular activity can see that activity on the SSN. Others, while on SSN, can not see this activity and have no knowledge of the participants in any activity they are not explicitly authorized access to.

These characteristics can be part of any Virtual Service Connection (VSC) on SSN. The duration of the VSC is user configurable and unique to the solution in the manner that a VSC's configuration can be specific to a particular service definition and the specific participants that service is provisioned to such that it is unique to the service and relationship(s) for that service.

The uniqueness of the solution may be best expressed through an analogy. Let's say, for example, you are going on vacation and would like to have your neighbor feed your dog once a day while you are gone. To do this you give your neighbor a key to your house so that he can get in and feed the dog. For simplicity let's assume the door to your house is a network on ramp. The house is a network where activities and rooms in the house are applications or business functions on the network. In today's network and application world there is nothing to stop your neighbor from giving your key to someone else and having them feed your dog. In addition, there is nothing that restricts your neighbor or anyone else from doing more than feeding your dog once they are in your house (on the network). They could sleep in your bed, watch TV or do any number of other things in your house once they are inside. Last and often most important, there is nothing that validates and confirms that your neighbor is the person that entered your house and that he did feed your dog each day you where gone and that is all he attempted to do. With SSN the above example could be enforced and created as follows: Using SSN you would publish a service to your neighbor called "feed your dog" and SSN would enforce and provide the following through a VSC: (1) SSN can enforce that the key you give to your neighbor is unique to your neighbor and will only work for your neighbor. It is useless if given to some one else. It will only open the door for your neighbor (mutual authentication). This would be inherent to the service definition "Feed your dog" and its relationship between you and your neighbor; (2) Once your neighbor enters your house SSN can enforce that he can only feed your dog (function specific authorization) through a function specific VSC. He can not wonder around the house or do anything else. If he tries to do something else he will be restricted from doing so and an audit log of a failed attempt to do something that you did not authorize him to do will be created and reported to you (absolute security and logging for all activities); (3) SSN can create an end to end audit trail telling you when the neighbor entered your house and that he did feed your dog and that is all that he tried to do.

In this simple example, the key to the house is an identity token that is unique to your neighbor. Your house is a network comprised of many functions or applications and has a unique identity token for the lock on the front door that confirms the door is a door to your house. Functions or applications in the house may include connections to many rooms (analogy to many applications like HR, Payroll, Benefits, etc., on a network or network segment). When your neighbor uses the key to enter your house SSN mutually authenticates you and your neighbor and confirms that he and you are who you say you are. SSN then looks to see what your neighbor is asking to do when he presented his key to your house. SSN checks to see that you have authorized your neighbor to enter your house to feed the dog. If you have not authorized this, your neighbor's key will not allow him in your house and he will be informed that he is not authorized to perform the activity that he has requested. Assuming he is authorized, a dedicated, secure, function specific tunnel (VSC) is created between the front door and your dog. Your neighbor can only use this tunnel to feed your dog. As part of this, an end to end audit trail is created for all actions whether authorized or not. What sets the SSN solution apart is that these elements of security are embedded in the network and can be applied uniformly or in variation to all activities on the network through a service definition. A VSC on the network is specific to a service (activity, function, application, web service, etc.,) and the participant(s) it is provisioned to. A unique VSC can be created and disposed of for each an every service invocation or can be left in place for the user determined time frame. In this case the user may be the service provider or an overall SSN administrator.

Traditional approaches would have enforcement and management fragmented and inconsistently controlled and applied across the network and devices or applications attached to it. The SSN solution can be transparent to the applications attached to it, but establishes a base level of comprehensive end to end security by service definition that is automatic for all traffic on the service network. This assures consistent reporting and tracking needed to support and enforce a basic business contract. Unlike a VPN, the VSC is specific to a service and the explicit provisioning of that service to participants using the solution.

The SSN security model invokes a "deny all" and "explicitly grant" access and process model for all service definitions on the network. This allows for the creation of a secure virtual network topology on any network transport independent of any other activity on that transport and makes the transport secure and trusted for that activity defined by a service and the provisioning of that service. In this manner all participants on the network can be assured that only activity that has been authorized by a participant is allowed and providers of services can control access to their services independent of any other participant. Any service attempts to probe or discover things on the network that are not authorized are automatically tracked and linked back to the device, individual, and/or application making the attempt allowing full governance enforcement and audit reporting.

The invention supports variations in the individual elements of security through a pluggable framework where each of the elements can be augmented/changed as plug in modules to address the latest threat in a specific element of security. For example, one or more of the encryption algorithms can be adjusted/replaced/supplemented as needed for a specific implementation, threat, participant, or market. This approach allows a risk based cost implementation as well as support for environments where export restrictions may limit the use of certain elements, or the support for environments where extreme security is needed.

The invention supports additional elements of security at the service level, application level, and the network transport level. This unique approach allows additional levels as defined by the participant without compromising the base security of the solution or impacting other participants. These additional levels of security are transparent to the base SSN security inherited by all services on the network through a VSC. As an example WS Security and SAML area easily incorporated into the solution and can be at the enterprise or individual service level. Security internal to an application or web service is transparent to the solution and can be complementary to the security provided by the solution of the invention.

There is no integrated implementation or process model that integrates all of the elements of security encompassed by the solution that works with new and legacy applications, multiple transports, and/or carrier diverse networks. The VSN result enabled by the invention allows for a virtual network management facility to be implemented on any physical network topology that enables the creation a secure virtual network communities.

The present invention establishes a Secure Services Layer allowing for a VSN comprised of Virtual Service Connections over existing and new network transport implementations. In addition, the invention adds a comprehensive layer of security to any application riding on the network that allows the application to be shared securely with any participant on the network by way of a VSC resulting from a Service Definition and the provisioning of that service to one or more participants. In the case of web services, the SSN VSC assures that there is security for any and all web services provisioned to the network. Current approaches to securing web services are piecemeal and inconsistent in terms of implementation. Most approaches rely on service level security using something like XML digital certificates, tokens, SAML or the like in the web service. These approaches result in the same fault as in the case with common application security today. The result is that your network and web service security is fragmented and impossible to consistently implement across a multi service and multi user environment.

The invention, by default establishes a network of trusted participants where information is shared among a defined set of users by way of SSN service definitions. Service definitions can be function specific, device specific, application specific, and/or user/participant specific. Users / participants can be defined in domains supporting one to one, one to many, and/or many to many relationships on the network. Service definitions result in the establishment of a Virtual Service Connection (VSC) for the duration of the activity that is specific to the participants and authorized by the service provider for the activity. By default, the logging element supports the ability to bill on a "pay per use" basis for each service definition and its unique users and at a minimum captures metrics around response time, payload size, and status to allow for integrated SLA reporting independent of the physical network and applications or web services using it.

A Secure Services Gateway (SSG) is used as an on ramp to the SSN. In one instance an SSG can be comprised of a Security Proxy and Service Implementation. In addition, there is an integration layer that facilitates legacy system integration. The security proxy portion of the SSG handles all core security and logging around any and all VSCs on the network. Depending on the nature of the service other elements of the SSG are optional and additional security can be implemented in the service layer where that security is specific to a service or as part of a service that is used by other services and participants on the network.

The audit trail element of security supports the tracking of originating requests beyond an instance of SSN and into a participant's private network by way of a unique Origination ID. The Origination ID allows a service request on the SSN to be linked back to an origination point and/or originating user/application/device outside of SSN but linked to SSN by way of the SSG. In addition, a unique ID is created for each service invocation as well as a correlations ID to allows for the correlation of multiple service invocations. The combination of these can be used to correlate a request to a series of resulting network activities such that an entire chain of events can be securely traced back to the origination. This enables transitive security to be enforced and reported on by the invention while also protecting the privacy of relationships of service brokers on the solution.

By combining a systems approach with a layered modular architecture the SSN solution results in a design that assures future security growth to react as threats and counter threats that emerge in the market. This solution architecture presented by the invention supports the unique ability to plug in various modules for each of the core elements of security. In this manner, the invention can support various implementation models where cost, performance, flexibility, risk, governance, value, and time to market are all drivers.

The invention supports layered security in a manner where the combination of an integrated solution and layers provides added security over traditional approaches. Layers may consist of elements at one or more of the following levels: (1) Physical Network; (2) Transport; (3) Message and/or Payload; (4) Application/web service; (5) User/participant; (6) Device The use of layers of security establishes boundaries of control so as no one element represents an imminent or total compromise of security. In this manner the solution has the ability to provide for a graceful degradation of security where time to react is provided by forcing a breach of security at more than one layer as well as a trail of the activity. Depending on the implementation approach these layers can be fully integrated or act as completely isolated motes of security around the data, application, users, device, functions, web services, etc., on the network. This provides for a separation of duties that may be needed to support unique governance, audit, or extreme security and privacy models.

The invention assumes that the network transport is not secure and that the applications attached to it have no, limited, or inconsistent security. This is where the VSC and VSN capabilities of the invention come in. They allow for the implementation of comprehensive end to end security independent of the applications and physical network transport.

The invention can do the following: (1) integrates security across any set of networked applications. This includes all of the security elements previously mentioned as basic to conducting business and enforcing a basic business contract. At a minimum this includes authentication, authorization, encryption, privacy, and end to end logging with optional non-repudiation. (2) Establishes a network embedded implementation and operational model of these security features that integrates the traditional separation between lower layers (for example, 1-3) and higher layers (for example, 4-7) in the OSI stack or similar network connection model. (3) A network security and process model where many governance models are supported that include strong central governance, peer to peer governance, or one or more hybrids of the two.

Examples of common governance hybrids include: (1) A central authentication management process (can be a service) where credentials issued by this central authority are used to establish and verify participants identity and authorization (Access Control List—ACL) and is enforced peer to peer by each of the individual participants that are service providers on the network. (2) A variation on hybrid 1 where ACL enforcement is both local and central and the local enforcement can further restrict privileges in the central ACL but can not grant new privileges that are not also in the central ACL. This approach is unique to the invention in that is does not require the service provider on the network to grant access control to their services and data to a third party or central governance entity on the network.

The Secure Service Gateways can be implemented in many forms depending on the need and governance model. Some examples include: SSG software running on clusters of commodity hardware where the hardware is configured for high availability, fault tolerance, and extreme through put. Others include SSG software running on custom hardware, SSG software running on a hardware appliance like a cable or DSL modem, network router, or network switch, card based module (NIC, Blade, etc.), SSG software running on a standard PC, laptop, PDA, cell phone or similar wireless device, and/or as a browser plug in. The SSG can run on any device that includes a basic CPU and non-volatile memory. SSGs can accommodate single users or multiple user group configurations.

Security proxies within the SSG can be chained together to allow for various control and logging points in any implementation. Examples of the need for this are the various hybrid governance models discussed earlier and described in previous art of the inventors referenced herein.

The security proxies can support many protocols. This provides for a flexible integration model to legacy networks, applications, in addition to network and device management functions. Additional protocols can be easily added allowing for implementation on many variations of one or more physical networks.

The SSN can include mutual authentication all participants in a VSC. The SSN can include two factor authentication by leveraging a credential unique to the user or device that is not explicitly known to the user. Two factor authentication can also leverage a credential unique to the user or device that is explicitly known to the user.

The SSN can also include two factor authentication where a PKI infrastructure provides one or more elements used in the authentication process. Authentication can be accomplished by leveraging a credential unique to the user and/or device that is not explicitly known to the user. Authentication can also be accomplished by leveraging a credential unique to the user and/or device that is explicitly known to the user.

One or more identity services can be implemented on the network where discovery and validation is a service that determines the validity of a participant based on the credential presented and data residing in any number of repositories on the network. Examples could include DMV lookup, DHS lookup, SS Administration look up, PKI certificate lookup, fingerprint database lookup, voiceprint lookup, facial feature lookup, DNA lookup, OCSP (Online Certificate Status Protocol), etc. In addition, a service can be provided that provides a quality score based on any set of credentials and responses. For example, a participant could check more than one thing and provide a score or an absolute response. The source for identity information can be the user or participant as well as a repository on the network that is validated by way of a Service on the network. Based on what is presented by the user/participant, a service on the network can resolve the validity of the presenter based on a service and information residing as an end point on the network The SSN has the ability to do SSG authentication combined with a service that provides an ability to authenticate the end user in the case where an SSG may have more than 1 user. This allows for complex and granular user level authentication and authorization over the network by way of simple service definitions on top of the base infrastructure. This can also allow participants to create their own authentication services for consumption by users over the network where those services are independent of anyone else on the network. This is supported by SSN by way of information stored in the SSG, GSSG or in a system attached to the network that is accessed by way of a service definition on the network.

One or more SSGs can provide means for authenticating Certificate Authorities (CA). One or more SSGs can also act as CA authorities for other SSGs on the SSN where the GSSG is an optional component. In this manner the solution allows for transitive trust or federated security to be established and managed across one or more CAs on one or more networks.

An authentication service may include one or more of the following XML security to include XML signature, SAML, XML Schema Validation, and/or WS-Security or the like.

The SSN can be comprised of security proxies wherein a condition for establishing a network connection is mutual authentication between proxies. In one implementation this can be accomplished using a PKI solution where all parties to a service, VSC, VSN, or service domain authenticate with each other using one or more trusted third parties. In this example one or more PKI infrastructures can be used for authentication and optionally for authorization and participant specific encryption. By integrating this with a user level authorization or authentication service separate but integrated security can be accomplished at multiple levels that may include the device security being separate from the user level security.

The security proxies can create a virtual secure network upon which VSCs are supported beyond that of services. This may include http/SOAP, telnet/3270, FTP, SMTP, SIP, SSH, http and the like. Essentially any protocol supported by TCP can be handled and the invention can be extended beyond TCP friendly protocols.

For all TCP protocols in an SSN, the security proxies can provide at least one or more than one of standardized encryption, authentication, authorization, logging, SLA reporting, and billing for activities on the network.

In order to protect the digital certificate model used in one implementation of SSN, the SSG can support a FIPs compliant storage and key generation mechanism as well as an overall FIPs compliant appliance. Biometrics in combination with other authentication mechanisms are supported as simple service definitions on the SSN.

Additional levels of participant authentication can be based on one or more secret credentials selected from the group consisting of bio metrics, User ID and password, digital certificates in the case of a PKI infrastructure, hidden files, cookies, RFID, USB storage devices, USB storage devices with a finger print reader, XML certificates, or any combination thereof.

A specific authentication service can be used at the SSN service level that provides a means for an additive level of network authentication above in addition to that which is performed at the base SSN infrastructure level.

In another embodiment of the present invention, GPS integration can be an integral part of the SSN network where the location of a user, participant, or activity on the network is geographically tagged in support of activities associated with conducting business over the network.

RFID integration can also be an integral part of the SSN network where activities over the network are geographically tagged in support of activities associated with conducting business over the SSN network. Using RFID, activities over the network can be geographically tagged, reported on, or tracked in support of activities associated with conducting business over the SSN network to include security functions like authentication, authorization, and encryption.

GPS provides three dimensional location data based on a GPS compatible receiver and a constellation of satellites. By integrating GPS receivers into an SSN implementation location data can be provided in one or more areas. GPS receiver integration at the SSG provides for location data with respect to any or all SSGs on an SSN implementation. This supports not only location management of the SSG but can also provide location data on devices attached to an SSG that provide positional data. Using this positional data and the core elements of security (Mutual Authentication and Authorization) embedded in SSN one can link positional data to devices, services and users on any instance of SSN and provide geospatially time based operational security reporting and enforcement.

In addition, through the incorporation of RFID, inventory management can be integrated with the SSN security model and location data provided by GPS integration. RFID can be integrated into base services on the network provided by any service provider. This allows for the world wide integration of inventory and logistic systems that are not all on a common platform or on a common security model.

Adding GPS positional information to devices, services, users, and participants on the network provides for new services not currently supported by other means. In addition, a greater degree of security can be established over a non-positional enabled function.

For additional high fidelity positional data, GPS supports the use of additional base stations. These base stations act as stationary satellites broadcasting positional information that is in addition to the satellite constellation. In one approach SSGs on an SSN implementation can act as these base stations allowing an SSN implementation that provides a degree of positional resolution that is significantly better than a standard GPS satellite only based solution.

Applications of this positional capability include: Positional reporting of elements of the network as well as positional reporting for a given service definition and participants on the network. Such functionality can provide significant value from both a security and a business perspective. Examples include online gambling where location can be confirmed within a given state's boundary in order to legally facilitate gaming. Others include fraud detection and use correlation through positional reporting and correlation. A greater degree of participant verification can be achieved by incorporating location and time in additional to the base security provided by mutual authentication, authorization, encryption, and user level authentication. Some include the application of positional integration into a variety of services that are intended for mobile device users or mobile activities. This may include high value financial transactions including money and inventory shipments. Other areas may include military and intelligence operations where time based positional awareness as a critical element of operational security.

By combining RFID and GPS on can arrive at an entire family of services on the SSN that are not currently possible. An example may include the integration of multiple non common legacy logistics systems that all provide some level of location reporting unique to their application but do it in a non-compatible or inconsistent format. Through SSN these systems can be aggregated in the total real time system through service definitions allowing a world wide operational logistics reporting solution that is much cheaper than converting the legacy systems onto a common platform so that they can communicate in real time.

The same functionally (world wide integration of non-common systems) would hold for legacy security systems, legacy inventory management systems and the like. This is accomplished through SSNs unique ability to provide for a secure infrastructure where services act as a normalized language translator for disparate applications attached to one or more instances of SSN where the integration to legacy systems is transparent to their security model, base functionality, and legacy architecture.

Discrete user authentication and authorization can be supported as part of an SSN implementation where SSN may provide this authorization and authentication or it may proxy this as a service where the data needed to confirm authorization and authentication is located in a system connected to SSN. A critical feature of the invention is that with this approach the service that accesses the data residing in a system connected to SSN is encapsulated in a the same security model as other traffic on the SSN.

In another embodiment of the present invention a Session Initiation Protocol ("SIP") is used to create and publish new services and service definitions on the network for one or more users, user domains, and/or service domains. SIP is used to publish multimedia and streaming services (including Voice Over IP) to any number of participants on the network. SIP can also be used to provide published mechanisms for any service definition on an SSN implementation.

The combination of SIP and SSN based security infrastructure provides a secure method for service discovery for all users on the network. The SSN provides for security, audit and end to end repudiation of all SIP activities.

In another embodiment, SIP is supported as a native dialog between security proxies. SSGs can provide secure SIP across any number of participants on SSN. A service to be provided on the network is published by any service provider on the network through the implementation of a SIP based service on the network. Authorization for use of a service is controlled by the service publisher and/or a central governance body. Authorization for the download of the service and service definition is controlled by the service publisher and/or SSN governance body or a CA specific to a service, user, or group of participants.

In one embodiment, a service to be provided on the network is checked into a version control system by the service author/publisher where users/requestors of that service can log into the system and download the service and service definitions for service consumption. A service to be provided on the network can also be checked into a version control system by the service author/publisher where users/requestors of that service can log into the system and download the service and service definitions for service consumption, where access control to the service is granted as part of the service publication and check in process. A service to be provided on the network can also be checked into a version control system by the service author/publisher where users/requestors of that service can log into the system and download the service and service definitions for service consumption, where access control to the service is separate from the service publication process.

The SSN can publish a listing of services available for consumption on the network for any participant in a network or service domain. The GSSG or SSG can publish services that facilitate the discovery of data, services or participants on the network in a secure and auditable manner that is isolated from all other traffic on the network.

Service providers on the network can create and publish services to participants on the network. Participants can go to a peer to peer or central repository to download detailed information about a service or set of services specific to a service provider or a group of network participants as defined by an SSN domain model.

A repository for services and service definitions is included on the network, where this repository represents a facility where services on the network are stored for version control, management, and distribution to authorized requestors. Service providers may grant access to specific services they have placed in a repository of services on the network independent of all other participants on the network.

A secure web services network infrastructure can be provided where service publishers can create and publish Web services to a repository on a network where consumers of services can download the service such that they may invoke the service in an SSN implementation. Access to the services in the repository can be controlled by the publisher of the service. Access to the services in the repository can also be controlled by the governance body for a specific SSN implementation that is separate from the publisher of the service.

The duration of a VSC connection is provider configurable. The VSC connection can also be established for the duration of a specific service fulfillment on the network and then disposed of. The VSC can also be independent of applications connected to the network by way of SSGs.

The SSGs can digitally sign the payload of data to be transmitted across SSN to assure that it came from the originator, has not been tampered with.

The SSGs can also digitally sign and encrypt the payload to assure that it came from the originator, has not been tampered with, and can only be opened by the originating SSG one a participant authorized by the originator.

The SSGs may also digitally sign and encrypt the payload to assure that it came from the originator and is guaranteed tamper proof based on artifacts unique to the service provider and service requestor. This may include items such as their digital certificates, specific data in the payload, and/or data about the originating device communicating through an SSG.

The SSGs may also digitally sign the payload to assure that it came from the originator, has not been tampered with, and can only be opened by the destination SSG or one of its users. The SSGs can also digitally sign and encrypt the payload to assure that it came from the originator, has not been tampered with, and can only be opened by the destination SSG or one of its users.

In another embodiment, the SSGs can digitally sign and encrypt the payload to assure that it came from the originator, has not been tampered with, and can only be opened by the destination SSG or one of its CA issued network participants.

In one implementation SSN implements a management facility that implements a layer that results in a Service Network Topology (VSN) where all of the elements needed to support as basic business contract are embedded in the network. In this manner a method for mutual authentication, provisioning of authentication credentials, provisioning of access authorization, management delegation, and encryption are all inherent to the solution.

The physical representation of the SSN management facility is that of a domain model that is enforced as part of an overall network management facility where functions can be centralized or distributed in support of many governance models. The SSN can provide a management facility that results in the comprehensive and secure management of a network of SSGs that is independently controlled by participants on the network and supports multiple network governance models.

In another embodiment, a VSC can be created where the VSC is a secure VPN tunnel that is function specific, requires mutual authentication for the end points and/or participants and authorization is a function specific but independent of applications and networks attached to the network. Also where function specific is defined by a service definition where that service definition can be a business function, web service, or mapping to existing business functionality or applications in an existing environment where secure and audited access is provided by the VSC and its associated service definition. The VSC is unique to a domain of users that can be defined as one to one, one to many, or many to many.

The VSC approach with embedded security that is function specific and independent of the applications or networks attached to it is unique. The ability to enforce ACL at the provider side for a specific function that is independent from a security perspective of the application attached to the network is unique. All of our elements of security are provided as result of a VSC connection and this level of security is in addition to and transparent to any security provided by the applications attached to it.

In a another embodiment the SSN can be implemented from one or more software based SSGs connected by a network. This software can run on commodity hardware that requires no more than a CPU, memory and a communication path to a network. Devices include multipurpose, multi-user and single user devices such as PCs, cell phones, cable and DSL modems, smart cards, smart watches, PDAs, wearable computers, set top boxes, and GPS devices. This software can also be used to established virtual network nodes as extensions to a physical network topology provided by a network equipment provider. This allows network hardware vendors to extend functionality beyond their physical equipment.

The SSN management facility (GSSG) can provide for core reporting and information gathering as well as the ability to house the WSDL and ACLs for services that are provided by any service provider on the network. The inherent SSN infrastructure supports HIPPA, Sarbanes Oxley, Patriot Act compliance as part of any service definition on the network.

In another embodiment of the present invention a service provider brokers services provided to the broker-provider from other service providers. These services can then be provided to the service requestors which the broker-provider has a relationship with on the network. This may be accomplished while maintaining the privacy of the relationship you have with your service providers from the relationship you have with your service requestors. A secure virtual service connection can be established with the requester, where the activity over that connection is controlled by a service definition and the role of the participants over that connection.

The solution of the invention supports many control and relationship models where transitive security, reporting, and audit is affected overall a broad range of service network users and service network communities. Examples follow.

EXAMPLE 1

Base SSN Relationships Model—Simple Requestor and Service Provider

FIG. 1 depicts relationship and control models for a simple SSN relationship. FIG. 1A illustrates the base SSN relationship model showing a simple requestor communicating to a service provider, namely, requestor SSG B makes a request R1 for a service S1 from service provider SSG A. This represents an example of a simple VSC for the service S1 provided by SSG A.

This figure displays a relationship model depicting a simple relationship allowed and enforced by the invention and represents a simple VSC. In this case an SSG A on the SSN is a provider of service S1 to the network and specifically granted access to this service to SSG B. SSG B consumes this service by way of a service request R1.

The control model for the relationship defined by this service is shown in the figure as the domain of S1R1 where the provider of S1 maintains absolute control even though reporting is a combination of SSG A and SSG B logging. Service Provider Control is enforced as described below.—SSG A: S1 for R1.

One example of the process and how this is supported by the invention follows. A service S1 is created and published to SSN by service provider SSG A. Service S1 is provisioned to the network through the services repository. Requestor SSG B is provisioned to have access to this service which is controlled by either the service provider or a central administrator or a combination depending on the governance model that is implemented. Requestor SSG B downloads the service definition from the repository and provisions it to SSG B. Once provisioned, SSG B can make request R1 for service S1. This is accomplished through a call process where R1 knows the path to S1 by way of a defined URL that is provisioned into the SSG. As part of the provisioning process SSG B and SSG A are aware of one another on the network and how to fulfill the request R1. When the request R1 is made the SSGs begin a mutual authentication process. As part of mutual authentication both parties SSG A and SSG B exchange digital certificates mutually validating they are who they say they are against a trusted party. This mutual authentication process is part of the SSL negotiation process between the SSGs. If Mutual authentication is not accomplished the connection is not completed. If mutual authentication is successful, an SSL encrypted tunnel is opened between the two SSGs that is specific to the service S1 and request R1 for those participants. Once the SSL tunnel is opened, the actual request is validated against the digital certificates (in this case for authorization, could also be a service as defined later) from both participants to confirm that SSG B is authorized to make request R1 of SSG B for service S1 from SSG A. This is accomplished by way of ACL validation. ACL validation confirms that SSG B has been grated access to service S1 through service request R1 and can be accomplished in many forms including local ACL enforcement, central ACL enforcement or a combination of the two. In the combination fashion, local ACL control can only grant access to service that are in a global ACL. However, the local ACL can further restrict access above and beyond the central ACL giving the service provider absolute control over who has access to their service which is a unique feature of the invention. If access is not authorized the connection is terminated and a logging event is triggered noting a service request attempt and authorization failure. If the authorization is successful the service request is fulfilled by SSG B as service S1. In this example control with respect to access to service S1 is maintained and enforced by the service provider. All activity is logged in terms of any service request and service fulfillment on the network. This logging is specific to the participants in the activity and unique to each service and service domain defined by the service provider. In addition to URL and ACL validation the SSG has a built in firewall component that allows management down to the port level for traditional IP network filtering. There are many variations in this process. The example provided is related directly to a web services implementation. However, the process is not limited to this. A service provider can define an infinite number of services. Once might include access to a legacy web application. In this manner the service definition defines the proxy relationship between the web app and the user's browser. The provisioning process within SSN provides for the ability to create and implement the control model and relationship models depicted in examples and FIGS. 1-9. The VSN and resulting VSCs are defined by the control models enforced by these functions of the invention. From the figures, it is clear how the invention supports a chain of trust and privacy model that is unique in the market for a multifunction carrier independent secure service network solution.

In one implementation the core elements of security are implemented as follows: Communication Encryption: Communication encryption is accomplished by way of a modular framework using TLS/SSL—using a wide range of encryption methods including AES 128, AES 256, and 3DES (any routine can be plugged in). Mutual Authentication: Accomplished by way of TLS/SSL negotiation, PKI digital certificates and Certificate Authority. The solution includes its own CA, CA hierarchy capability and management facilities or can leverage an external CA. CA life cycle management to include CRL management is included in the solution offering. In one implementation, the invention uses TLS/SSL to authenticate servers and clients and then uses it to encrypt messages between the authenticated parties. In the common authentication process today one way authentication is the norm. In this model a TLS/SSL client sends a message to a TLS/SSL server, and the server responds with the information that the server needs to authenticate itself. In this model the client trusts that he is talking to a trusted server, which in many cases is not a valid assumption.

In the case of the invention all SSGs are assumed as servers and require a mutual bidirectional authentication to authenticate and prove all parties involved in the exchange of information. In addition to protecting against data disclosure, the TLS/SSL security protocol used as one element in the invention can be used to help protect against masquerade attacks, man-in-the-middle or bucket brigade attacks, rollback attacks, and replay attacks.

Authorization—leveraging Digital Certificates, access control is linked to a given business function/activity specific to the participant SSGs with optional user level authorization that is defined as a service on the network. This is accomplished by linking the URL for a service to the certificates used for authentication and then validating authorized access against an XML, OpenLDAP, LDAP repository, or the like.

Payload encryption and tamper proofing—using a PKI infrastructure internal or external to the solution a service provider can digitally sign and/or encrypt the payload for any given service. Optionally XML certificates and certificates that may be included in a specific service or retrieved by way of a service through an application attached to the network can also be used. As part of this process the following three elements are supported. (1) signing of the payload to assure who it is coming from and or who created it. (2) tamper proofing the payload by using an algorithm that creates a data signature that is unique to the activity and participants. (3) encrypting the payload such that only one or more of the participants specific to that service invocation or a trusted third party service provider can read the payload. As part of this, management of a set of digital keys is included such that there is a key that is unique to the originator, the requester, and a master or two party scheme for decrypting the payload. The two party scheme includes the requirement of two keys to open the payload. One key us owned by one or more of the participants and the second key is owned by a trusted third party data management service provider that may be a service on the network. In addition, when no third party is used the need for keys from two or more participants can be enforced in order to open a payload associated with a service on the network. In the two party scheme both keys are needed to open the payload. In the case of a one party scheme only one of the participant keys is needed to open the payload and that control can be implemented as a unique feature of a service definition on the network and follows the control models described in examples 1-9.

User level Authentication and Authorization for a multi-user device or SSG—the invention can accomplish this as an internal or external service definition where the service validates a user against an internal or external credential and or certificate repository. One approach supported is to leverage the current ACL validation process that includes user level information. In addition the solution can authorize against an external repository to include but not limited to external applications, LDAP, active directory, ACF2, RACF, or any combination. This process follows the control models explained in examples 1-9.

End to End Reporting, Logging, Audit, Non repudiation—the invention supports this as a function of any VSC activity on the network. All activity is logged and linked back to a unique Point of Origination ID, users, SSGs, participants, and a unique request ID for any VSC activity on the network. This allows the invention to validate that the activity is unique and specific to any participants on the network for all service definitions on the network.

Additional service level security—Any web service over SSN can leverage any of the basic WS-I security elements that are under development. This includes but is not limited to XML certificates, SAML and the like.

Privacy—Accomplished by way of a mix of all of the above with a minimum of mutual authentication, authorization, communications encryption, end to end reporting and logging specific to a service definition and its participants. Privacy follows the control models described in examples 1-9.

EXAMPLE 2

Multi-User With
Privacy—Multi-Services/Multi-Requestor Complete
Privacy

FIG. 2 depicts a relationship model with multiple users and a privacy function allowing complete privacy for the multiple services and multiple requesters on an instance of the invention. In the control model the business relationship between participants remains private; SSG C and SSG B are not aware of each other since SSG A has not allowed this as part of its service definitions for S1 and S2 for each requester.

This figure displays a relationship model depicting a multi-user environment allowed and enforced by the invention. In this case the service provider provides a service to one or more requesters—Requestor (SSG B) makes request R1 for Service S1 from Service Provider SSG A;—Requestor (SSG C) makes request R2 for Service S2 from Service Provider SSG A.

The control model for the relationship defined by this service is shown in the figure as the domains of S1R1 and S2R2 where the provider maintains absolute control even though reporting is a combination of multiple users and SSGs. Key features include: Audit, reporting, service repository, and privacy domains by service and by relationship; Business relationship between participants remains private; SSG C and SSG B are not aware of each other since SSG A has not allowed this as part of its service definitions for S1 and S2; Service Provider Control is enforced as described below—SSG A: S1 to R1;—SSG A: S2 to R2.

EXAMPLE 3

Multi-User With Privacy—Single
Service/Multi-Requestor Complete Privacy

FIG. 3 depicts a relationship model that provides multiple users with privacy when using the same service from a common service provider where complete privacy is maintained for the requesters. The service requesters are shown R1 to S1 and R2 to S1. Requestor SSG B requests R1 for service S1 from service provider SSG A; requestor SSG C requests R2 for service S1 from service provider SSG A.

This figure displays a relationship model depicting a multi-user environment allowed and enforced by the invention. In this case the service provider provides a service to one or more requestors—Requestor (SSG B) makes request R1 for Service S1 from Service Provider SSG A;—Requestor (SSG C) makes request R2 for Service S1 from Service Provider SSG A.

The control model for the relationship defined by this service is shown in the figure as the domains of S1R1 and S1R2 where the provider maintains absolute control even though reporting is a combination of multiple users and SSGs. Key features include:—Audit, reporting, service repository, and privacy domains by service and by relationship;—Business relationship between participants remains private;—SSG C and SSG B are not aware of each other since SSG A has not allowed this as part of its service definition for S1; Service Provider Control is enforced as described below—SSG A: S1 to R1;—SSG A: S1 to R2.

EXAMPLE 4

Multi-User With Group Privacy—Single Service/Multi-Requestor Group Privacy

FIG. 4 illustrates a relationship model for multiple users with participant group privacy and the provision of a single service with multiple requester group privacy. The service requests are R1 to S1 and R2 to S1; requestor SSG B requests R1 for service S1 from service provider SSG A; requestor SSG C requests R2 for service S1 from service provider SSG A.

This figure displays a relationship model depicting a multi-user environment allowed and enforced by the invention. In this case the service provider provides a service to one or more requesters and enforced group privacy for a service that more than one requestor is aware of.—Requestor (SSG B) makes request R1 for Service S1 from Service Provider SSG A;—Requestor (SSG C) make request R2 for Service S1 from Service Provider SSG A.

The control model for the relationship defined by this service is shown in the figure as the domain of S1R1S1R2 where the provider maintains absolute control even though reporting is a combination of multiple users and SSGs. Key features include:—Audit, reporting, service repository, billing and pricing can remain private unless agreed to by the group and provider; That fact that there is business relationship between participants remains private to the Group or Domain defined by S1R2S1R1; —SSG C and SSG B are aware of each other since SSG A allows it as part of its service definition for S1 to the group S1R2S1R1. However, details like billing and reporting are private to the relationships defined by S1R1 and S1R2 unless otherwise allowed by the owner of service S1. Service Provider Control is enforced as described below—SSG A: S1 to R1;—SSG A: S2 to R1.

EXAMPLE 5

Multi-User With Group Privacy—Multi-Service/Multi-Requestor Group Privacy

FIG. 5 illustrates a relationship model for multiple users with participant group privacy and multiple service/multiple requestor group privacy in which the service requesters are R1 to S1 and R2 to S2; requester SSG B requests R1 for service S1 from service provider SSG A; and requestor SSG C requests R2 for service S2 from service provider SSG A.

This figure displays a relationship model depicting a multi-user environment allowed and enforced by the invention. In this case the service provider provides a service to one or more requestors and enforced group privacy for a service. Requestor (SSG B) makes request R1 for Service S1 from Service Provider SSG A;—Requestor (SSG C) makes request R2 for Service S2 from Service Provider SSG A.

The control model for the relationship defined by this service is shown in the figure as the domain of S2R2S1R1 where the provider maintains absolute control even though reporting is a combination of multiple users, multiple services, and SSGs. Key features include: Audit, reporting, service repository, billing and pricing can remain private. Business relationship between participants remains private to the Group or Domain defined by S2R2 S1R1. SSG C and SSG B are aware of each other if SSG A allows it as part of its service definitions for S1 and S2 to the group/domain S2R2 S1R1. However, details like billing and reporting are private to the relationships defined by S2R2 and S1R1 unless otherwise allowed by the owner of service S1 and S2. Service Provider Control is enforced as described below—SSG A: S1 to R1;—SSG A: S2 to R2.

EXAMPLE 6

Multi-User With Individual Participant Privacy—Multi-Service Providers/Multi-Requestor FIG. 6 illustrates a relationship model for multiple users with individual participant privacy and multiple service providers and multiple requestors. The service requestors are R1 to S1 and R2 to S2; requestor SSG B requests R1 for service S1 from service provider SSG A and requestor SSG C requests R2 for service S2 from service provider SSG D.

This figure displays a relationship model depicting a complex multi-user environment allowed and enforced by the invention. In this case each service provider provides a service to one or more requestors and enforces privacy for each relationship defined by the service provider. Requestor (SSG B) makes request R1 for Service S1 from Service Provider SSG A. Requestor (SSG C) make request R2 for Service S2 from Service Provider SSG D.

The control model for the relationship defined by this service is shown in the figure as the domains/groups of S2R2 and S1R1 where the providers maintain absolute control even though reporting is a combination of multiple users, multiple services, and SSGs. Key features include: Audit, reporting, service repository, billing and pricing can remain private. Business relationship between participants remains private to the separate Groups or Domains defined by S2R2 and S1R1. SSG C and SSG B are not aware of each other. SSG A and SSG D are not aware of each other. However, details like billing and reporting are private to the relationships defined by S2R2 and S1R1 unless otherwise allowed by the owners of services S1 and S2 and governed by the group defined by the owners of S1 and S2. Service Provider Control is enforced as described below—SSG A: S1 to R1.—SSG D: S2 to R2.

EXAMPLE 7

Multi-User With Group Privacy—Multi-Service Providers/Multi-Requestor

FIG. 7 illustrates a relationship model for multiple users with group privacy, multiple service providers and multiple requestors. The service requests are R1 to S1, R1 to S2, R2 to S1, and R2 to S2; requestor SSG B requests R1 for service S1 from service provider SSG A; requestor SSG C requests R2 for service S2 from service provider SSG D.

This figure displays a relationship model depicting a complex multi-user environment allowed and enforced by the invention. In this case each service provider provides a service to one or more requestors and enforces privacy for each relationship defined by the service provider. Requestor (SSG B) makes request R1 for Service S1 from Service Provider SSG A. Requestor (SSG C) makes request R2 for Service S2 from Service Provider SSG D.

The control model for the relationships defined by the services are shown in the figure as the domains/groups of S2R2 S2R1 and S1R1 S1R2 where the providers maintain absolute control even though reporting is a combination of multiple users, multiple services, and SSGS. Key features include: Audit, reporting, service repository, billing and pricing can remain private. Business relationship between participants remains private to the Groups/domains defined by S2R2S2R1 and S1R1S1R2. SSG C and SSG B are aware of each as allowed by a group defined by S2R2 S2R1 or group defined by S1R1 S1R2 as depicted. SSG A and SSG D are not aware of each other nor are they aware of anything but there respective relationships with their service requestors. Service Provider Control is enforced as described below:—SSG D: S1 to R1 and R2.—SSG A: S2 to R2 and R1.

EXAMPLE 8

Figure 8:
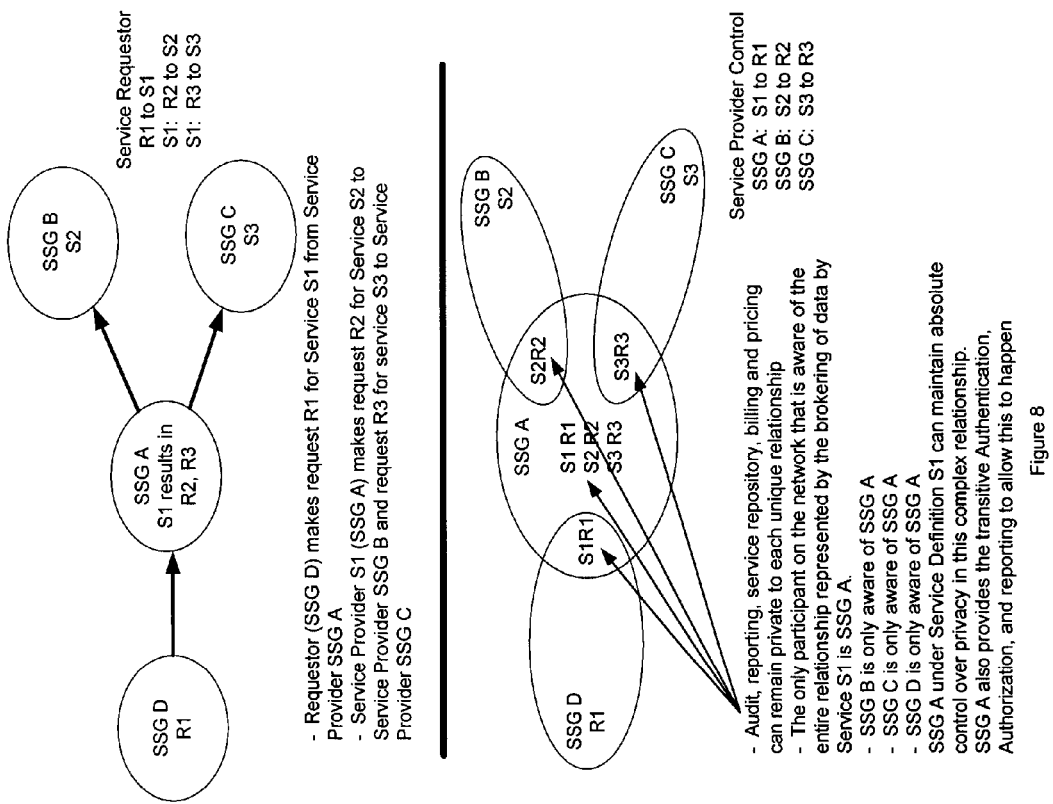
FIG. 8 depicts an example of relationship model (disclosed by the inventors herein in one or more of their prior applications); case 8: multi-participant with service provider broker and transitive security and audit—multiple service providers (embodiment of the invention).

Multi-Participant With Service Provider Broker and Transitive Security and Audit—Multiple Service Providers FIG. 8 illustrates a relationship model of multiple participants with service provider broker and transitive security and audit functions and multiple service providers. The service requests are R1 to S1 and from S1, R2 to S2 and R3 to S3. Requestor SSG D requests R1 for service S1 from service provider SSG A; service provider S1 SSG A requests R2 for service S2 to service provider SSG B and requests R3 for service S3 to service provider SSG C.

The figure displays a brokered transitive relationship model depicting a complex multi-user environment allowed and enforced by the invention. In this case each service provider provides a service to one or more requestors and a chain of reporting and trust allows for a service provider to act as a broker of data from other service providers such that the original requestor is not aware of anything more than their direct relationship with a provider. Requestor (SSG D) makes request R1 for Service S1 from Service Provider SSG A. Service Provider S1 (SSG A) makes request R2 for Service S2 to Service Provider SSG B and request R3 for service S3 to Service Provider SSG C.

The control model for the relationships defined by the services are shown in the figure as the domains/groups of S1R1 and S2R2 and S3R3 where the providers maintain absolute control even though reporting is a combination of multiple users, multiple services, and SSGs. Key features include: Audit, reporting, service repository, billing and pricing can remain private to each unique relationship. The only participant on the network that is aware of the entire relationship represented by the brokering of data by Service S1 is SSG A.—SSG B is only aware of SSG A. SSG C is only aware of SSG A. SSG D is only aware of SSG A. SSG A under Service Definition S1 can maintain absolute control over privacy in this complex relationship. SSG A also provides the transitive Authentication, Authorization, and Reporting to allow this to happen Service Provider control is enforced as described below: SSG A: S1 to R1. SSG B: S2 to R2.—SSG C: S3 to R3.

EXAMPLE 9

Figure 9:
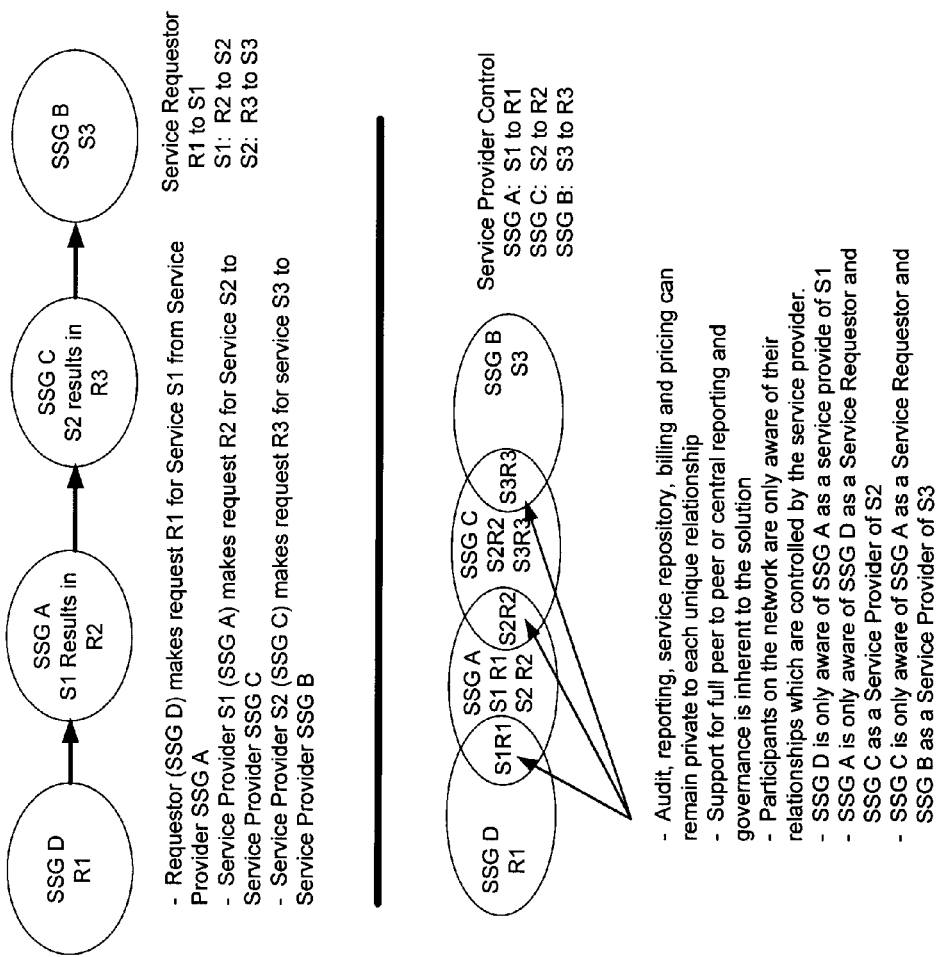
FIG. 9 depicts an example of relationship model (disclosed by the inventors herein in one or more of their prior applications); case 9: multi-participant with service provider broker and transitive security and audit—multiple service providers (embodiment of the invention).

Multi-Participant With Service Provider Broker and Transitive Security and Audit—Multiple Service Providers FIG. 9 illustrates a relationship model of multiple participants with service provider broker and transitive security and audit and multiple service providers. The service requests in a sequence or series: SSG D R1 to SSG A S1 resulting in R2 from SSG A to S2 at SSG C which results in R3 from SSG C to S3 from SSG B.

This figure displays the unique brokered transitive relationship model depicting a complex multi-user environment allowed and enforced by the invention. In this case each service provider provides a service to one or more requestors and a chain of reporting and trust allows for a service provider to act as a broker of data from other service providers such that the requestor is not aware of anything more than their direct relationship with a provider. Requestor (SSG D) makes request R1 for Service S1 from Service Provider SSG A. Service Provider S1 (SSG A) makes request R2 for Service S2 to Service Provider SSG C. Service Provider S2 (SSG C) makes request R3 for service S3 to Service Provider SSG B.

The control model for the relationships defined by the services are shown in the figure as the domains/groups of S1R1 and S2R2 and S3R3 where the providers maintain absolute control even though reporting is a combination of multiple users, multiple services, and SSGs. Key features include: Audit, reporting, service repository, billing and pricing can remain private to each unique relationship. Support for full peer to peer or central reporting and governance is inherent to the solution. Participants on the network are only aware of their relationships which are controlled by the service provider. SSG D is only aware of SSG A as a service provider of S1. SSG A is only aware of SSG D as a Service Requestor and SSG C as a Service Provider of S2. SSG C is only aware of SSG A as a Service Requestor and SSG B as a Service Provider of S3. All Service provider SSGs under their respective service definitions can maintain absolute control over privacy in this complex relationship. Each service provider provides the transitive Authentication, Authorization, and Reporting to allow this to happen.

Service Provider control is enforced as described below: SSG A: S1 to R1. SSG C: S2 to R2. SSG B: S3 to R3. Through governance the entire processing chain can be reviewed and managed in terms of SLA enforcement, audit, security and reporting without compromising the business relationship outside of those defined by a given service provider defined relationship.

EXAMPLE 10

Service Repository—Simple Service Provider and Service Requestor

Figure 10:
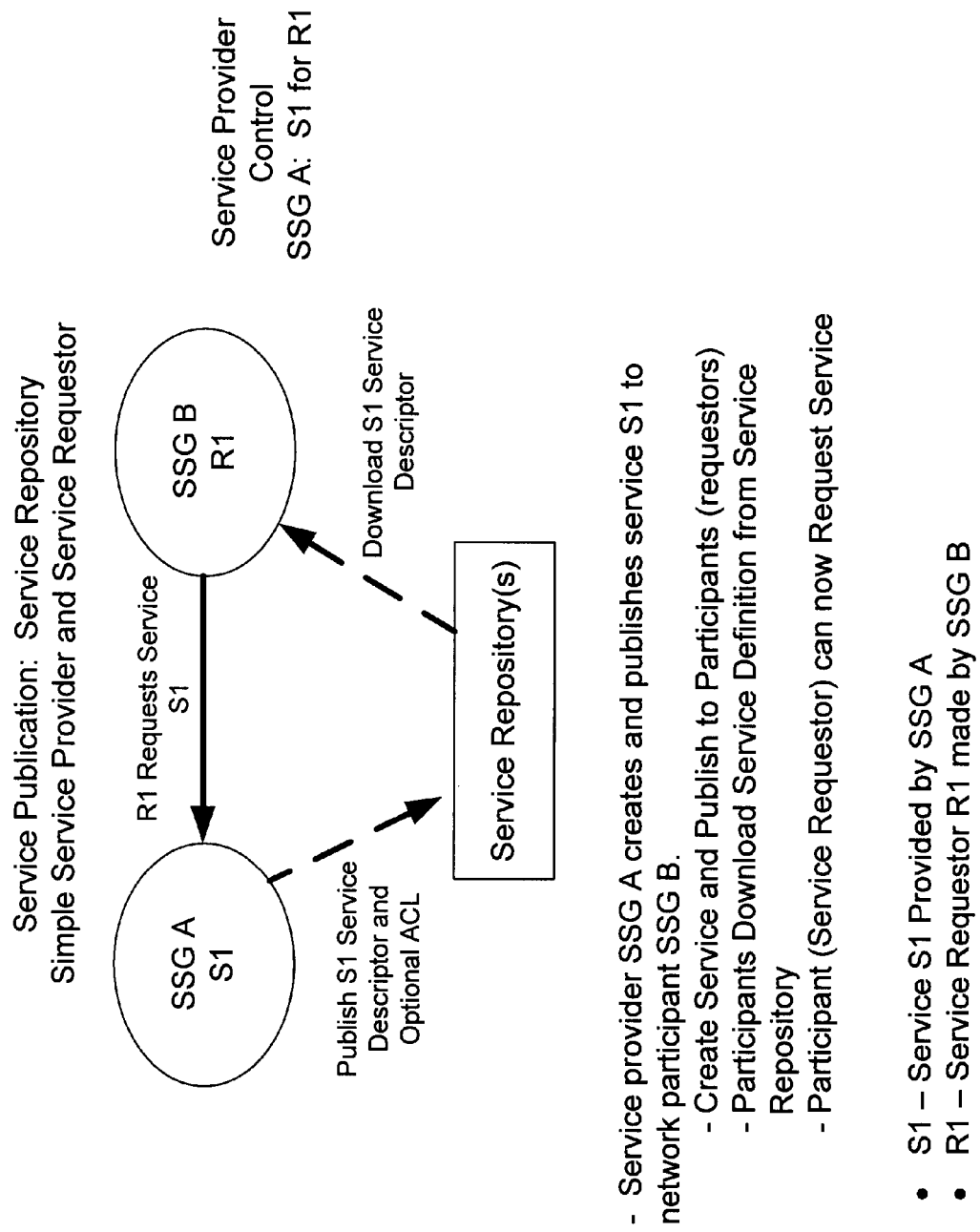
FIG. 10 depicts an example of relationship model service publication: service repository, simple service provider and service requestor (disclosed by the inventors herein in one or more of their prior applications).

Example 10 relates to service publication, a service repository and a simple service provider and service requestor. In FIG. 10, R1 from SSG B requests service S1 from SSG A, SSG A publishes the S1 service descriptor and optional ACL to the service repository and the repository allows the download of the S1 service descriptor in accordance with the request. The service provider control is SSG A allowing S1 for R1. Thus, the service provider SSG A creates and publishes service S1 to network participant SSG B. The example creates a service and publishes to participants/requesters; participants download service definition from the service and repository; and the participant service requestor can now request service; the service S1 is provided by SSG A and R1 is the service request R1 made by SSG B. This diagram provides a service repository where service providers can publish service definitions for participants to download and implement. The security associated with access to this repository may be directly tied to the access rights for a given service or they may be generally provided to any number of groups or participants on one or more SSN implementations. Administration and location of the service repository may be local, central, or a hybrid depending on the desired governance model as well as the overall administration and privacy policies. Governance for the service repository does not have to be the same as the governance model implemented for a given SSN implementation. This is unique to the solution. Access to the repository can be in or out of band of the SSN implementation. For example, this may be a service on the SSN or may be a web portal where access is out of band of the core SSN implementation. Their may be many repositories. For example, there could be one per service provider, one per group or domain, or one per SSN implementation or any combination thereof.

In this diagram the following is a general process. Service provider SSG A creates and publishes service S1 to network participant SSG B. Create service and publish to participants (requesters). Service is placed in Service Repository for download (with optional requester access control to the repository). Participants Download Service Definition from Service Repository. Participant (Service Requestor) can install Service Request on local SSG and request service. Service Provider Control. SSG A: S1 for R1.

EXAMPLE 11

Service Discovery: Single Composite Request Multiple Services

Figure 11:
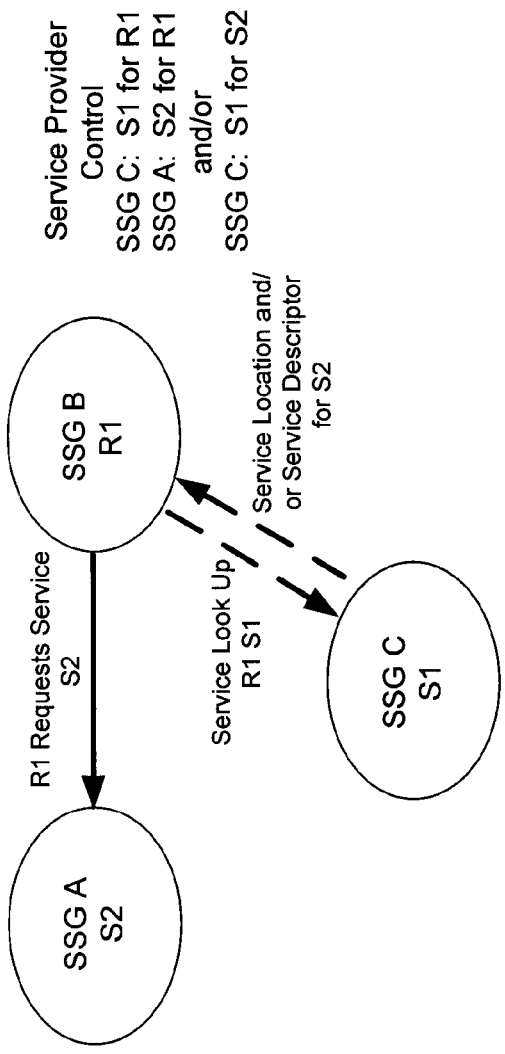
FIG. 11 depicts an example of relationship model; case 1: service discovery: single composite request multiple services (disclosed by the inventors herein in one or more of their prior applications).

As shown in FIG. 11, Example 11 relates to the discovery of a service in the network and a single composite request for multiple services. SSG A and service S2, SSG C and service S1 and SSG B with request R1 issued are depicted. The service provider controls are SSG C: S1 for R1; SSG A: S2 for R1; and/or SSG C: S1 for S2. R1 requests service S2. The service look up is R1 to S1; SSG C provides the service location and/or service descriptor for S2. Service S2 is discovered on the network through service S1 at SSG C; S1 is published to a group of users that may be one or more SSGs; however, S2 is specific to a request from R1 and private to the response from S1 for the S2 service. In this case S2 is private to the request from R1 and the S1 service provided by SSG C. Access authorization can be enforced by any combination of the following: ACL at SSG C; S1's response to R1; and ACL at SSG A. S1 can be implemented at SSG A if needed. In this figure a discovery process is described and supported by the invention as a single request resulting in multiple services that includes service discovery. Service S2 is discovered on the network through Service S1 at SSG C. S1 is published to a group of users (could be one or more SSGs). However, S2 is specific to a request from R1 and private to the response from S1 for the S2 service. In this case S2 is private to the Request from R1 and the S1 Service provided by SSG C. Access Authorization can be enforced by any mix of the following: ACL at SSG C; S1 response to R1; ACL at SSG A; S1 can be implemented at SSG A if needed.

Service Provider Control is described below in terms of the figure—SSG C: S1 for R1;—SSG A: S2 for R1 and/or SSG C: S1 for S2.

EXAMPLE 12

Service Discovery: Request Per Service, Per Participant

Figure 12:
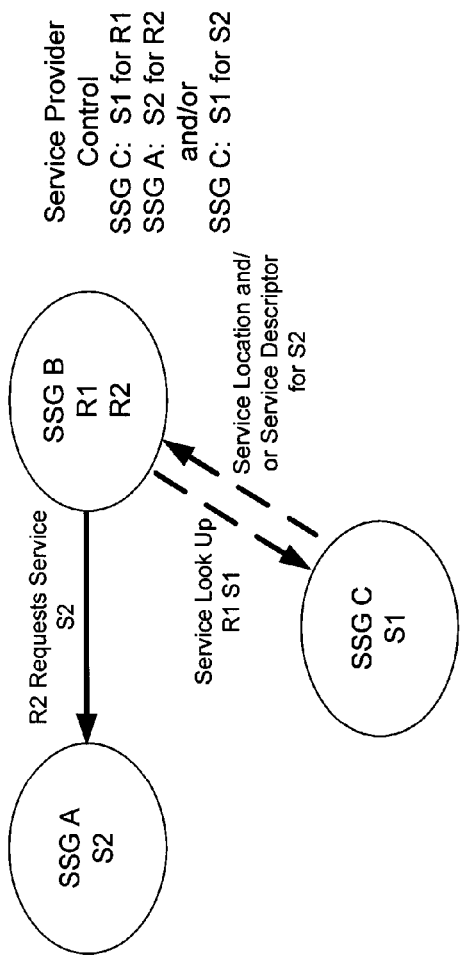
FIG. 12 depicts an example of relationship models; case 2: service discovery: request per service, per participant (disclosed by the inventors herein in one or more of their prior applications).

As shown in FIG. 12, Example 12 relates to the discovery of a service in the network and a secure request per service, per participant. In FIG. 12, service S2 is discovered on the network through service S1 at SSG C by way of R1; the service look up is R1 S1; SSG C provides the service location and/or service descriptor for S2; R2 is issued at SSG B and requests service S2 from SSG A. The service provider control at SSG C is S1 for R1; at SSG A, S2 for R2; and at SSG C, S1 for S2. Service S2 is discovered on the network through Service S1 at SSG C by way of R1. Service S2 is invoked by R2 where R2 may be part of the service description provided by S1. S1 is published to a group of users that may be one or more SSGs. R1 is Specific to S1. R2 is the request for S2; however, S2 is specific to a request from R2 and private to the response from S1 for the S2 service. In this case S2 is private to the request from R1 and the S1 service provided by SSG C. Access authorization can be enforced by one or more of the following: ACL at SSG C; S1's response to R1; and ACL at SSG A. \S1 can be implemented on any SSG in the network. In this figure a discovery process is described and supported by the invention as a sequence of services where the original requestor makes a request for a discovery service and the result is a request to another service. This is a key element of the invention allowing for both simple and complex discovery as well as simple and complex call chain processing where trust and audit is maintained for the entire call chain of activity but where privacy can be restricted to the immediate service provider and service requestor relationships. Service S2 is discovered on the network through Service S1 at SSG C by way of R1. Service S2 is invoked by R2 where R2 may be part of the service description provided by S1. S1 is published to a group of users (could be one or more SSGs). R1 is Specific to S1. R2 is Request for S2. However, S2 is specific to a request from R2 and private to the response from S1 for the S2 service. In this case S2 is private to the Request from R1 and the S1 Service provided by SSG C. Access Authorization can be enforced by any mix of the following: ACL at SSG C; S1 response to R1; ACL at SSG A. S1 can be implemented on any SSG in the network. Service Provider Control is described below in terms of the figure SSG C: S1 for R1; SSG A: S2 for R2 and/or SSG C: S1 for S2.

EXAMPLE 13

Multi-ACL Enforcement, Local, Central, and Two Step

Figure 13:
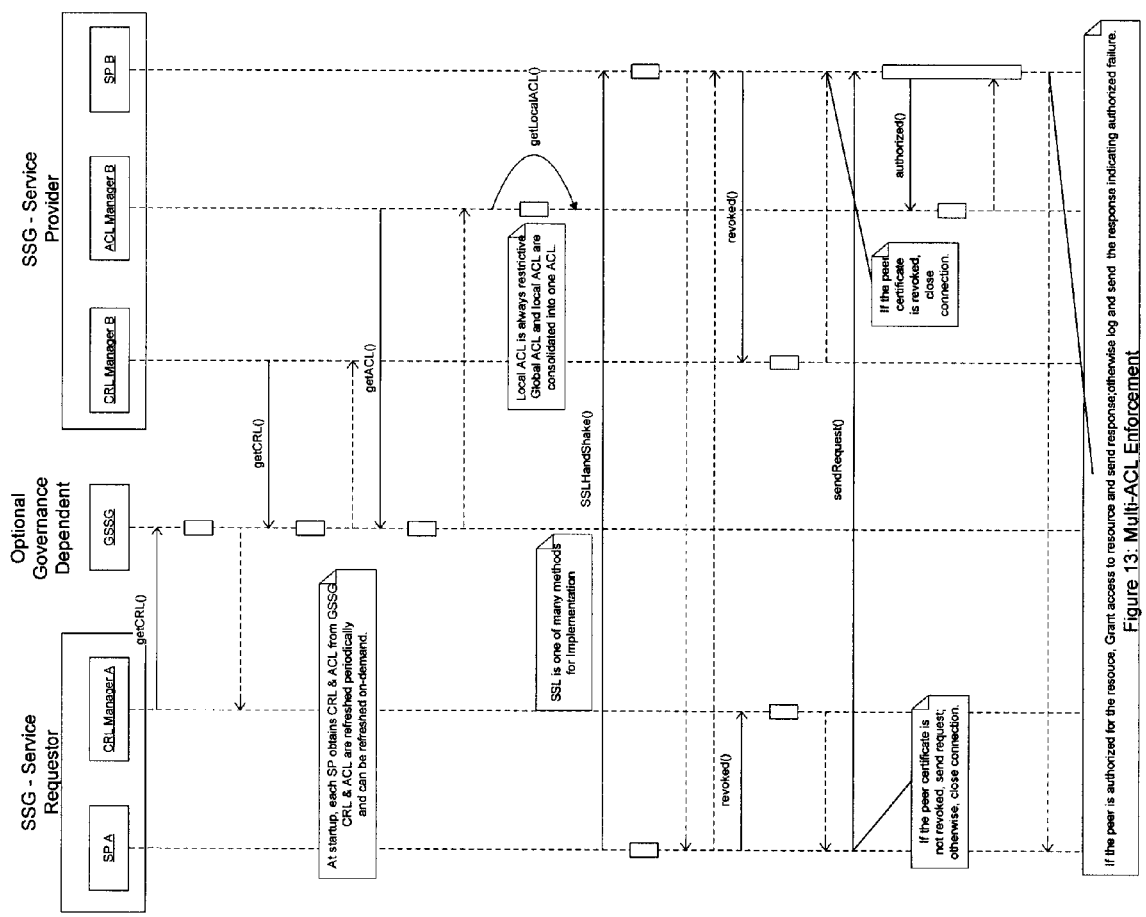
FIG. 13 is a flow chart of an example of an embodiment of the invention showing multi- ACL enforcement.

FIG. 13 represents a process flow chart for protocols that are evident from the operations described in the chart at the SSG service requestor and at the SSG service provider providing optional governance dependency at the GSSG. If a peer is authorized for the resource requested, the governance authority will allow access to the resource and send a response; otherwise, the authority will log and send a response indicating an authorization failure. Thus, multi-ACL enforcement is provided. The figure describes many processing flows for Access Control Enforcement supported by the invention. These process flows support a wide range of governance and enforcement options providing several features unique to the invention. Strong central ACL enforcement can be implemented by way of any GSSG, strong peer to peer or distributed ACL enforcement can be implemented by way of any SSG that is a service provider, and any combinations of these two options can be implemented to provide a hybrid governance model. In the hybrid model the invention supports a unique ACL enforcement where a central ACL is checked and then a local ACL is checked. The local ACL can only further restrict access to the service, it can not grant service privileges that are not in the central ACL. This allows the local service provider to maintain absolute control over their services independent of any other participant on an SSN implementation which is unique to the invention. The invention also supports caching of data to support enhanced performance in these various ACL implementation modes.

EXAMPLE 14

Integration Support—Simple Relationship Model

Figure 14:
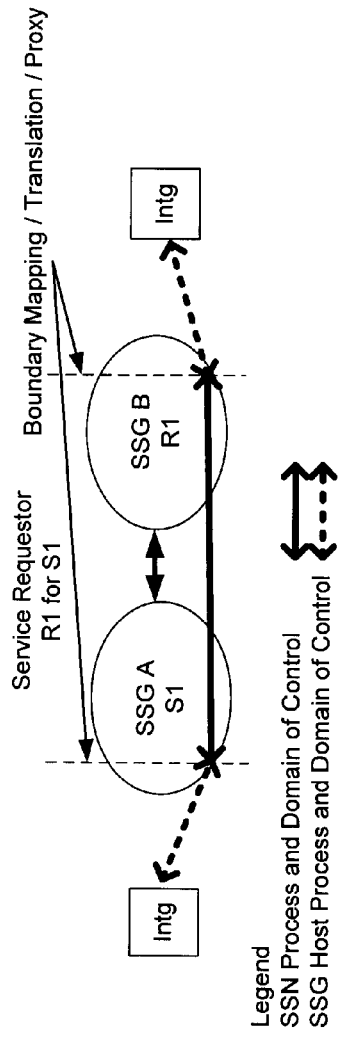
FIG. 14 depicts an example of an embodiment of the invention of the relationship model; case 1: integration support—simple relationship model.

FIG. 14 shows an adaptation of the invention to provide secure integration support for an enterprise in a simple relationship model. Other models are supported as described herein but not detailed due to the large number of possibilities as described in examples 1-13. In this example, the service requestor is R1 for S1. The drawing legend defines the SSN process and domain of control and the SSG host process and domain of control. Boundary mapping, translation and proxy functions are provided. The integration cells represent systems, business functions, network functions, network protocols, and applications and the like that may be integrated as service definitions on an SSN implementation. Some integration examples include legacy applications, legacy functions, new applications, new functions, existing web service, new web service, web applications, network applications, network functions, secure service gateways, any TCP friendly protocol solutions, and business process engines such as a BEPL tool. The secure service network depicted in this example 14 also supports a basic request and response format as well as streaming protocols and application proxies by way of the functionality inherent to the SSG and the overall SSN topology. In this figure the basic integration model supported by SSN is described. The boundary controls are identified and defined in terms of SSN and the resulting functionality. The components of the SSG can be separated to address DMZ and firewall control points at the boundaries. For example, the Security Proxy and Service Interface (Service Implementation) can be located on separate hardware and isolated by layer 1-3 network partitioning. In addition multiple SPs can be chained together to address transition and control points in and out of separate networks. This would be useful when applied to the transition from private to private network or the transition from private to public network including the internet.

EXAMPLE 15

SSN Basic Protocol Support—Centralized Governance Example

Figure 15:
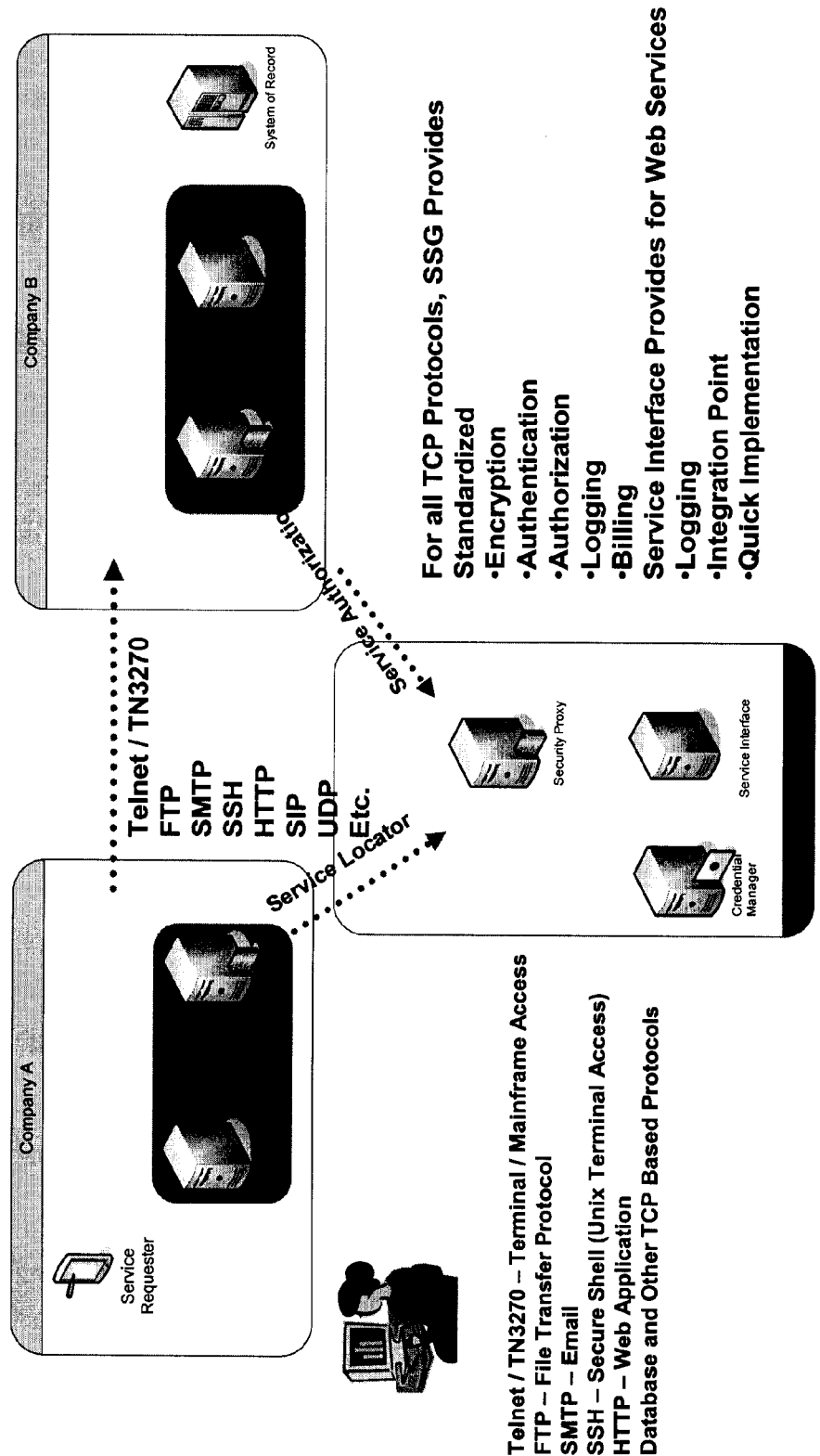
FIG. 15 depicts an embodiment of the invention providing a SSN basic protocol support—centralized governance example.

FIG. 15 illustrates the adaptation of the invention where the SSN basic protocol support utilizes a centralized governance example with service locators and return service authorizations. The service requests to the administrator include protocols such as Telnet/TN3270, FTP file transfer protocol, SMTP e-mail, SSH secure shell in Unix access, HTTP web applications, databases and other TCP based protocols. For all implemented protocols, SSG provides standardized: encryption, authentication, authorization, logging, and billing. The service interface provides for web services including logging, an integration point and quick implementation. In this manner the invention supports a broad range of integration, admin, access, and function models all through service definitions which result in Virtual Service Connections on the network. VSC can be protocol specific and/or unique to two or more participants. The solution can operate in proxy mode for applications that are using the protocol native to a service. As an example, a web based application (http and https) can be mapped to the SSG by way of URL mapping allowing the applications to inherit all of the security and reporting features of the invention with no changes to the client or server applications exposed through the service.

EXAMPLE 16

Figure 16:
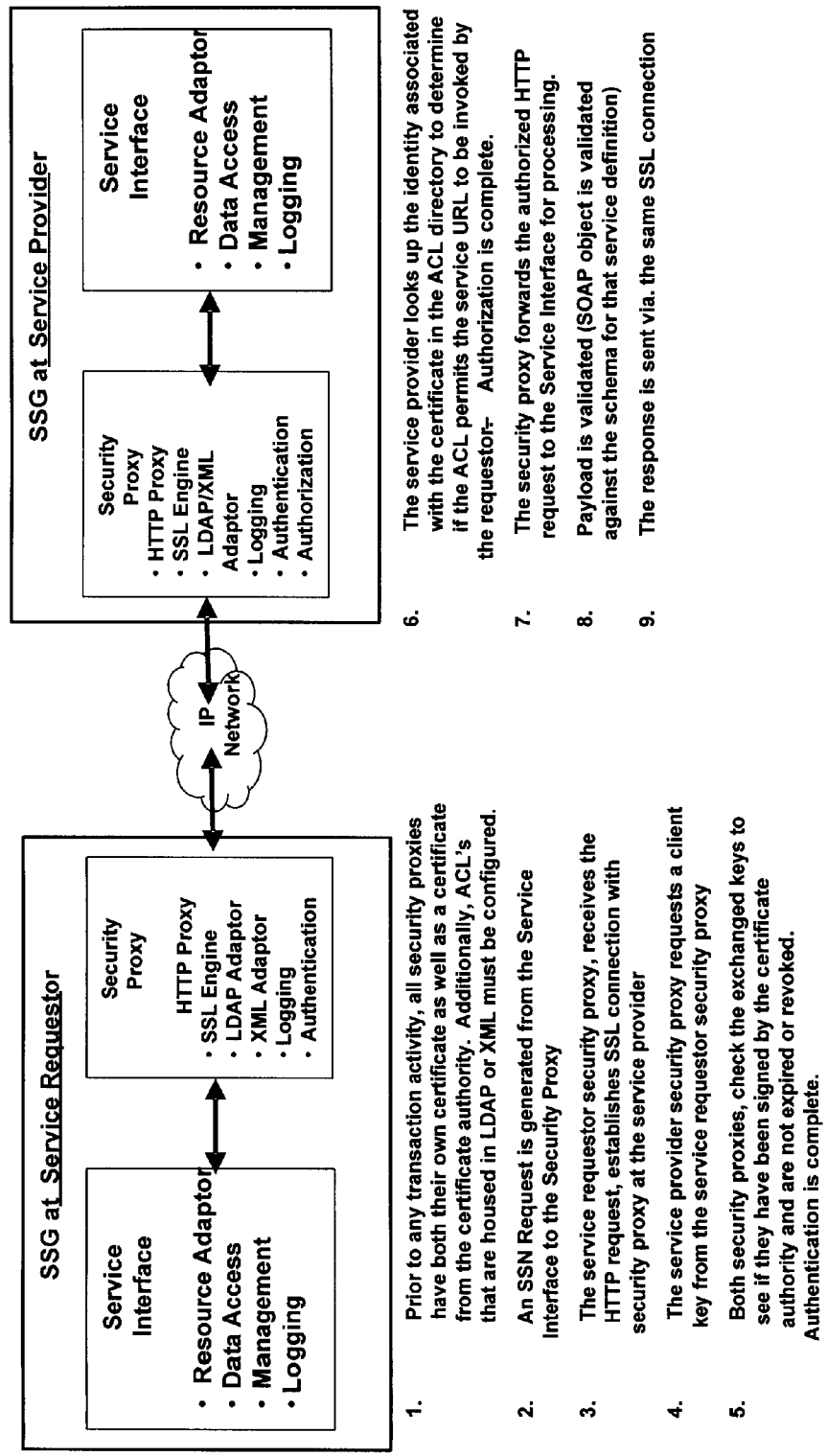
FIG. 16 depicts an embodiment of the invention showing SSN sample process flow for SSL, CA, ACL implementation web service requestor and service provider example.

SSN Sample Process Flow For SSL, CA, ACL Implementation—Simple Web Service Requestor and Service Provider Example FIG. 16 shows an SSN sample process flow for SSL, CA, ACL implementation with a web service requestor and service provider example. In the SSG at the service requestor, (1) prior to any transaction activity, all security proxies have both their own certificate as well as a certificate from the certificate authority, ACL's that are housed in LDAP or XML can be configured; (2) an SSN request is generated from the service interface to the security proxy; (3) The service requestor security proxy, receives the HTTP request, and establishes an SSL connection with a security proxy at the service provider; (4) the service provider security proxy requests a client key from the service requester security proxy; and (5) both security proxies check the exchanged keys to determine whether the keys have been signed by the certificate authority and are not expired or revoked. Authentication is thereupon complete. At the SSG at the service provider: (1) the service provider looks up the identity associated with the certificate in the ACL directory to determine if the ACL permits the service URL to be invoked by the requestor, thereupon authorization is complete; (2) the security proxy forwards the authorized HTTP request to the service interface for processing; (3) the payload (SOAP object) is validated against the schema for that service definition; and (4) the response is sent by way of the same SSL connection. In this figure an example of the basic SSN process model for the establishment of the VSC is outlined. In a web services implementation the Service Interface may or may not be internal to the SSG. For other Services the SI is an optional component and may be represented by anything on the client network side of the SSG. In support of this approach the Security Proxy in the SSG is mapped directly to point of the network specific to that service definition. As needed, the SSG can support encryption on the SSN and the client side of the network to assure end to end activity security. This figure shows only SSL on the SSN side of the network. In addition, the SSG supports a firewall implementation in addition to any network level filtering. This is a basic configuration option in the SSG allowing a secure and auditable link between Service URL(s), Participants Certificates, Service Definition, IP address, Device, User, and MAC address. The SSG and overall SSN supports both the audit and logging of positive Authentication and Authorization activity on the network as well as non-authorized activity.

Running in proxy mode, the service interface is replaced by the server and client application. For a web application this would be a web server on the Service Provider side and a browser on the Service Requestor side. With no changes to the application, the web application will inherit the SSN security model defined for that service. This is accomplished by way of simple URL mapping. This allows for the secure management, reporting, and provisioning of new and existing applications using a single unified and comprehensive administration console. This is a unique feature of the invention that has significant impact on security and compliance reporting for existing applications and processing environments.

EXAMPLE 17

SSN Sample Implementation Of Straight Through Processing In Financial Services

Figure 17:
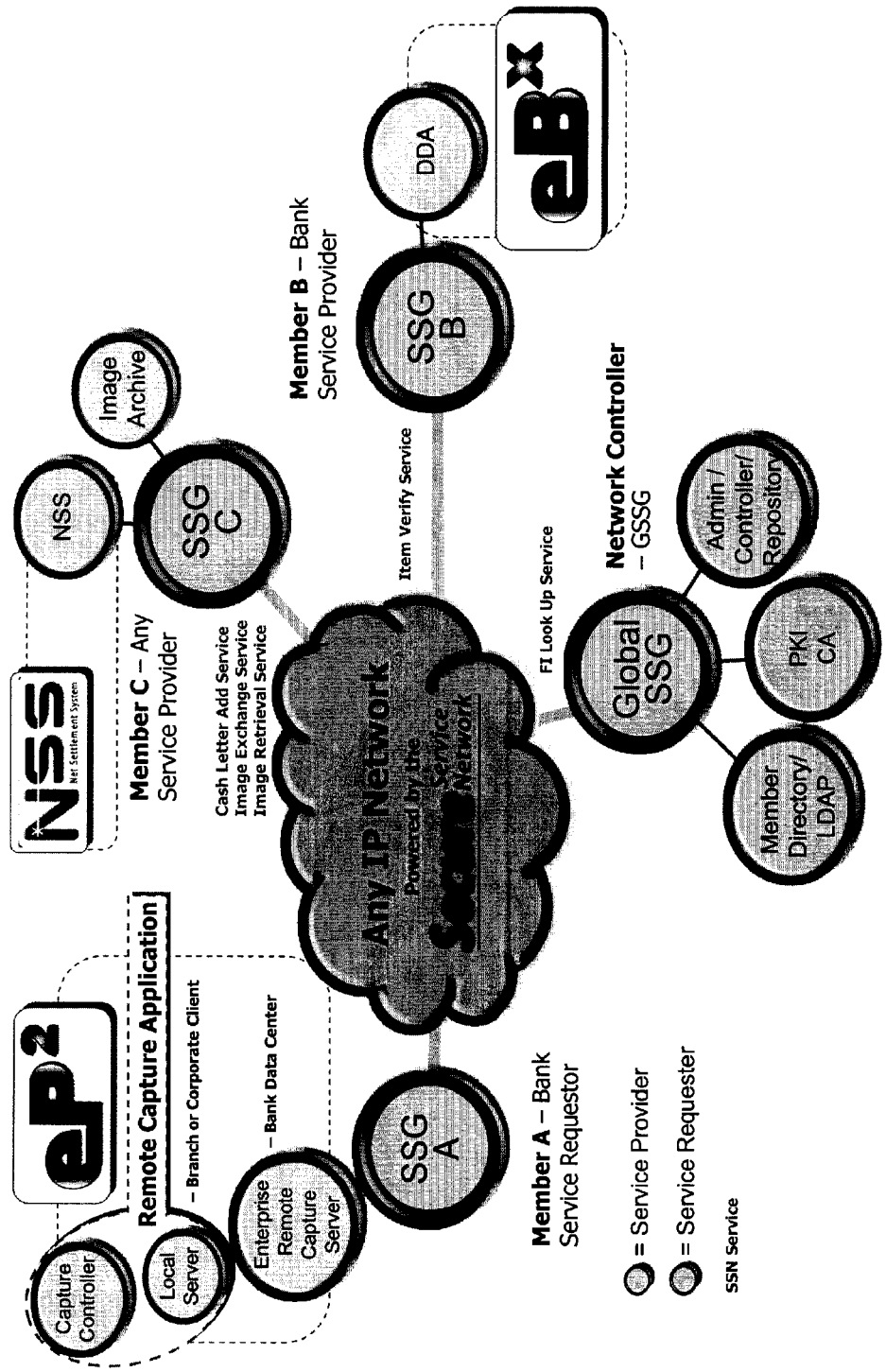
FIG. 17 depicts SSN simple implementation example supporting financial services straight through processing (disclosed by the inventors herein in one or more of their prior applications).

FIG. 17 illustrates an SSN implementation example supporting financial services straight through processing. In FIG.

17 participants are linked together by way of an SSN implementation. Each participant has its own legacy applications depicted by eP2, eBx, NSS, and image archive on the network. Service providers are identified in Red and Service Requestors are identified in Blue. SSN services are identified in Blue Text. Real time and batch services are represented. SNN Participants; Member Bank A—Service Requestor; Member Bank B—Service Provider; Member C Service Provider Utility—Image Archive, Net Settlement; SSN Network Infrastructure; Any IP Network; SSN Intelligent Network Gateways; Any to Any SSN Services; Item Verify—Member Bank for On We Check Verification; Cash Letter Add—Net Settlement Service Provider; Image Exchange—Image Archive Provider; Image Retrieval—Image Archive Provide; Applications; eP2—Remote Check Capture Application; Generic Image Archive; NSS—Net Settlement Application; EBx—Operational Data Store for Member Bank DDA.

This figure demonstrated how the solution supports the real time item verification of a check drawn on Bank B that is presented at Bank A and how the unique governance and security model of the invention allows for straight through processing among a group of participants. Bank A is presented with a check drawn on Bank B. Bank A makes an Item Verify request from Bank B in real time. Bank B responds with one or many options. Could be details about the account are just a yes no and therefore protecting the customers privacy and the banks customer relationship. Upon a successful response Bank B sends the check image to Member C and generates a cash letter to Member C. Both Bank A and Bank B use Member C as a third party processor for check image and net settlement. This is a real world example where the invention enables an On-We straight through processing network that includes multiple participants, multiple services, multiple applications, that utilizes one or more of the relationship and control models defined in examples 1-14 to ensure end to end comprehensive security, privacy, and reporting for all activity on the SSN.

Using this same example the solution of the invention can be used to create one or more secure virtual network communities for bill presentment where the biller or bill presenters define and provision services to their users independent of other billers. This alleviates the need for billers to normalize to a common platform and also assures that they maintain customer privacy and control.

EXAMPLE 18

Figure 18:
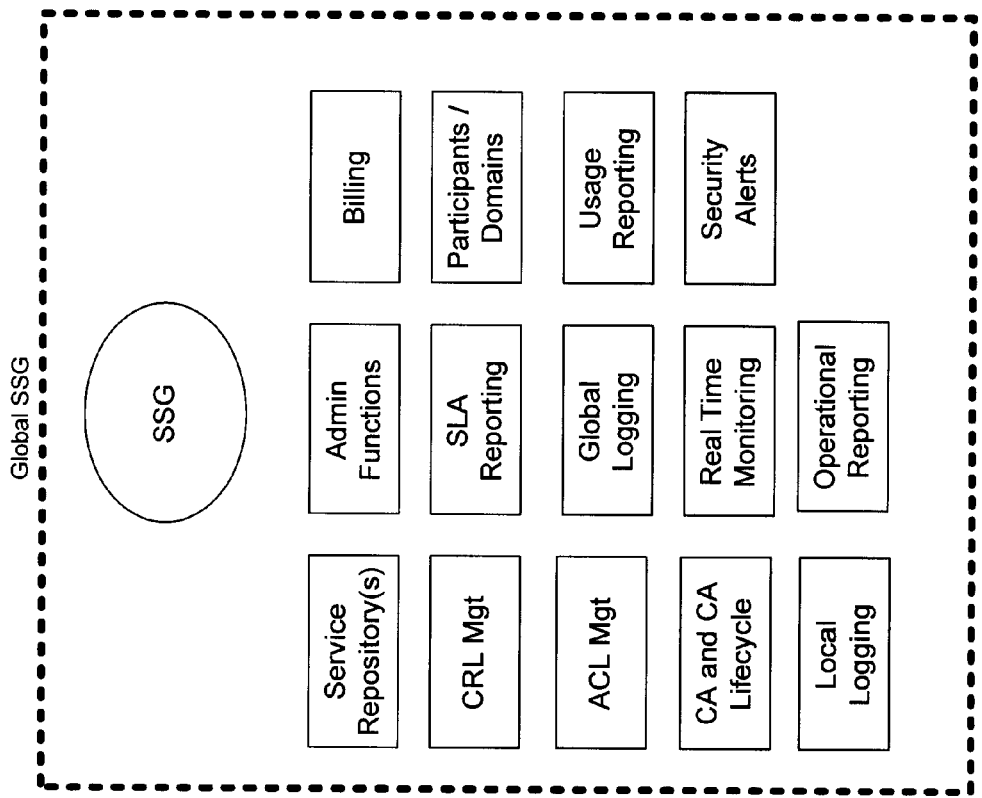
FIG. 18 depicts sample GSSG functions and SSN network SORs (disclosed by the inventors herein in one or more of their prior applications).

Sample GSSG Functions and Core Management Functions That Are Distributed To SSGS Depending On the Governance Model FIG. 18 depicts an example of GSSG functions and SSN network Systems of Record (SORs), including service repository, administration functions, billing, CLR management, SLA reporting, participant and domain tracking, ACL management, global logging, usage reporting, CA management, real time monitoring, security alerts, local logging, and operational reporting. FIG. 18 depicts the core management functions inherent to the SSN model. Note that the figure shows that the GSSG is an SSG configured to include core management functions as well as systems of record for an instance of SSN. By using this modular approach one can arrive at many governance models by simple centralizing or distributing these functions across an implementation of SSN. Access to these functions can be in band, out of band, or by way of services a VSCs on one or more instances of SSN.

EXAMPLE 19

Example Of Using SSN For DHS Secure Information Sharing

Figure 19:
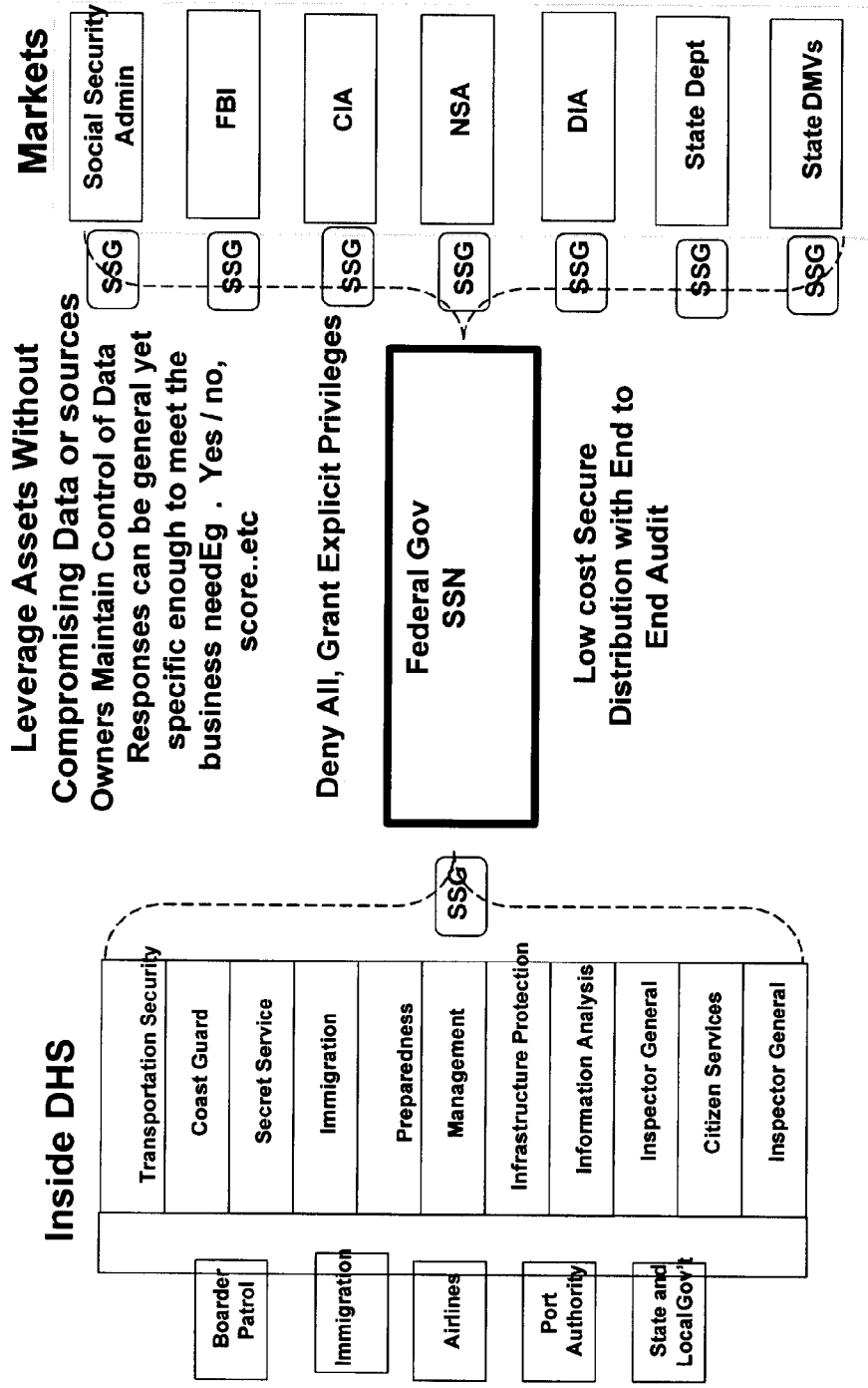
FIG. 19 depicts an embodiment of the invention showing federal government homeland security linking inside functions to outside suppliers.

FIG. 19 depicts an example of an SSN adaptable to federal government homeland security linking internal functions with outside suppliers in a secure and auditable fashion. In FIG. 19, the use of SSN allows a participants to leverage and securely provision and manage existing assets without compromising security or reporting. The owners maintain control of data; responses can be general, yet specific enough to meet a business need, such as a yes/no answer, a score, or other data. The SSN can deny all security model where functions or applications are provisioned to participants as services over SSN. This approach addresses that access and audit issues associated with the dissemination of data residing in existing applications to a diverse group of users.

FIG. 19 depicts an implementation of SSN where SSN acts as a mechanism for sharing sensitive time critical information among a broad range of sensitive government agencies without requiring these agencies to give up or loose control of their data. The ability for SSN to implement and protect the participants in a particular service as well as the ability for SSN to create a service where you are providing responding information without details that could compromise sources and methods or participants is critical. For example, I could create a service that is lookup based on name and last known address. SSN could implement a service (owned by each data owning organization) that allows a inquire into each of the legacy systems (services published by the data owners) in the organizations on the right hand side of the slide. These organizations can respond with qualifiers that provide enough detail about the given name but no compromising info. In this manner DHS can do its job and the data owners can protect their data. For example, I could ask if there is a Robert Smith located at address X. The response could be we have no info, yes we have info, and you may request additional detail if needed. There is an audit trail for all activity as well as the associated responses to a request. Another example might be has their been any information collected in the past 72 hours that includes the phrase "XXXX YYYYY AAAAA SSSSS." A simple yes no could lead to a series of escalations based on the response and the criticality of the request. These escalations can be additional services or out of band activities. In any case enough information is shared to accomplish the business objective while protecting the sources and methods around the data, participants, and activity.

EXAMPLE 20

Example Of SSN Being Used For A Secure Healthcare Focused Network

Figure 20:
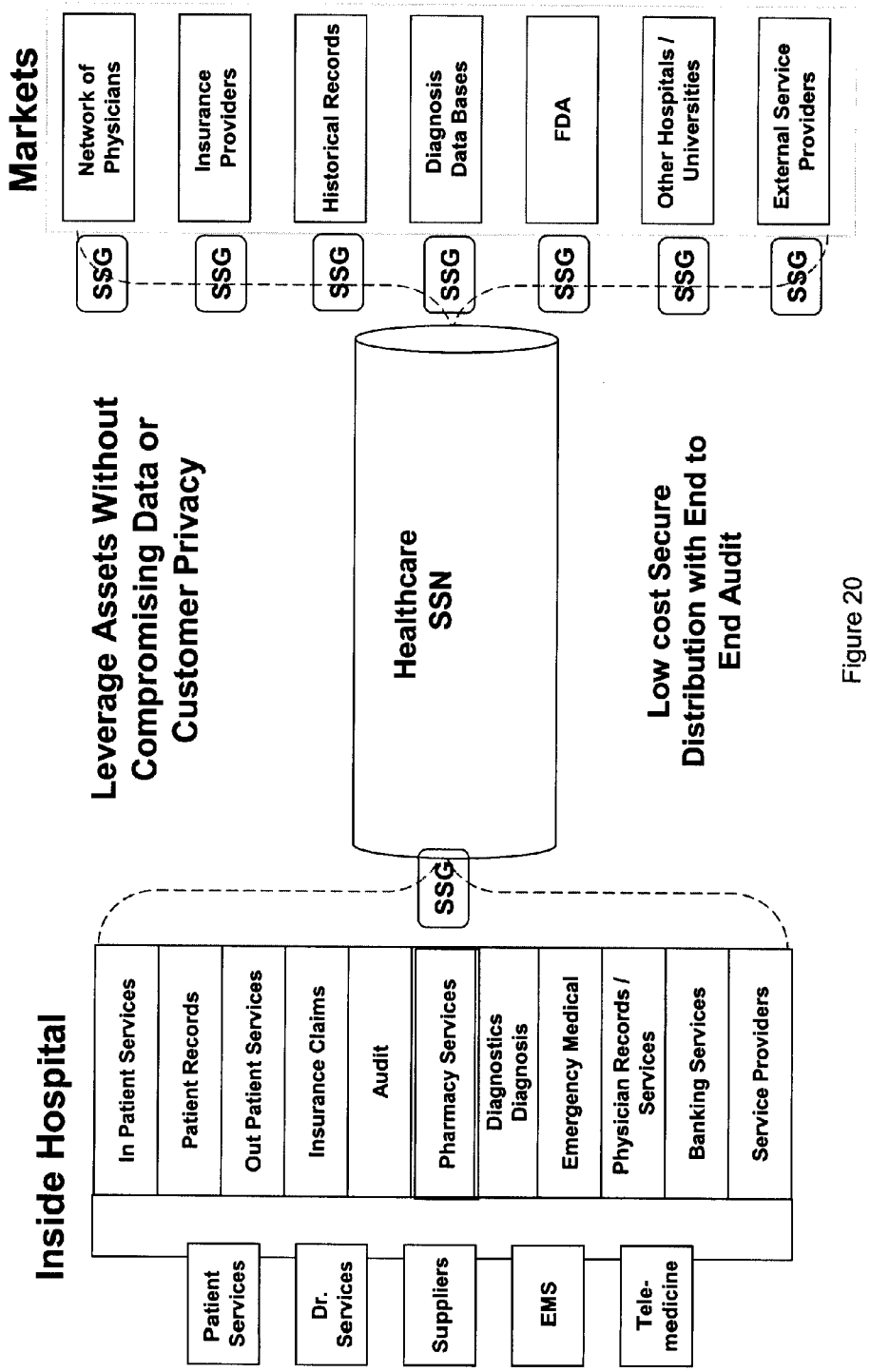
FIG. 20 depicts an embodiment of the invention showing health care—linking inside functions to outside suppliers.

FIG. 20 is similar in context to example 19 but applied to healthcare. It depicts an implementation of SSN where critical patient information can be protected in addition to critical insurance, diagnostic, and related data. The same network can manage and securely share a broad range of information by way of service definitions over SSN. Compliance, billing, SLA, and audit reporting is simple as an embedded element of SSN. The same could be applied to the financial service industry and specifically to Bill Presentment. Using SSN each biller could securely create, publish, provision, and manage billing services independent of other billers. Customers would be provisioned access to each biller's services allowing them to fulfill the bill presentment function. This approach eliminates the need for the billers to normalize to a common billing platform or even a common system and also maintain control of their information independent of all other network participants. This approach also eliminates customer privacy concerns through a secure provisioning and administration process.

EXAMPLE 21

OSI Stack Example and Market Separation Between Network and Application Provider Example of Traditional Network Stack and Separation—this points out the variations in interpretation and implementation as well as the security gap created by the separation between network and application provider in a network world.

In the seven-layer OSI stack, the top layers are usually bracketed together as "application layers," and the bottom layers are bracketed as the "network layers". Most descriptions of this stack are vague about demarcating the boundaries between layers and this is further complicated when working in a mixed application and/or protocol environment. Application: applications written to run over the network. Examples: email, file transfer, order-service, HR. Presentation: protocol and data conversion, transport-independent policies. Examples: encryption, Qos routing, caching, security. Session: session management, checkpointing, reliable delivery. Examples: HTTP 1.1, SSL, SQL, NFS, RPC. Transport: flow control, error checking, guaranteed delivery. Examples: TCP. Network: logical>physical address translation, route. Data link: packets-to-bits conversion, data frames. Examples: MAC, LLC. Physical: transmits raw bitstream over physical cable.

The fundamental premise of a layered architecture requires that applications make use of facilities supported in lower layers in the network stack by delegation. In this model, applications do not change with changing configurations or policies at lower layers. For example, whether the session protocol used by the web server is HTTPS or HTTP, a web application (a JSP or ASP for instance) is not written differently. Instead, the transfer is handled as a session/transport layer binding (layers 4/5) that is set by appropriate web server deployment-time configurations.

Mature standards and products have helped applications abstract out functionality at the session layer and below. However, to date, many layer-six operations that do not belong in the application layer are, in fact, implemented as an integral part of the application code. In addition, security around packet routing and encryption is often handled in the lower layers where there is no context of user or data content. The result is that security is not handled consistently in a multi-user and multi-application environment. At the network level security is only as good as your weakest perimeter device and at the application level security is only as strong as your weakest application. SSN assumes the network and applications attached to it are not secure by default and enforces a comprehensive security model that addresses this uniformly for all traffic on SSN.

EXAMPLE 22

Example Of Virtual Service Network On Physical IP Network

Figure 21:
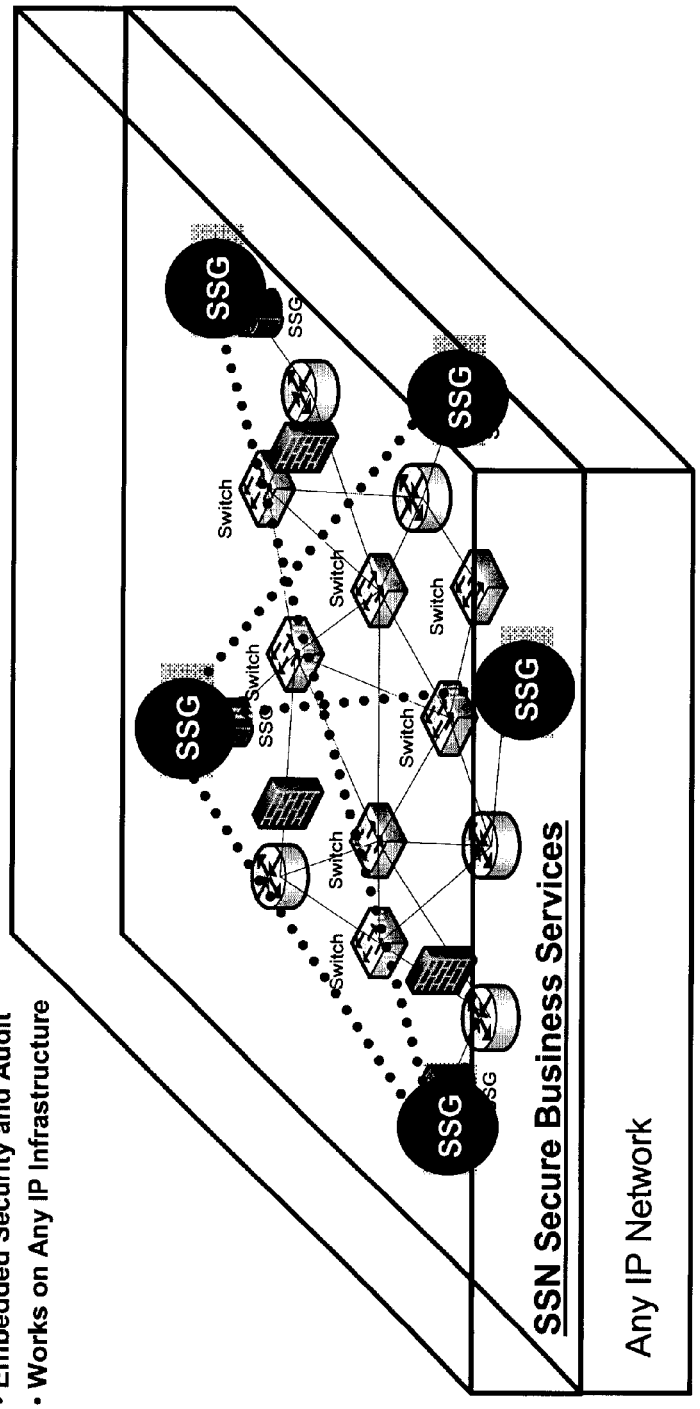
FIG. 21 depicts an embodiment of the invention showing secure services layer on any IP network.

FIG. 21 depicts the virtual secure network layer that SSN enables to be placed on top of a traditional physical transport. An IP network example is provided. Connections between SSGs are VSCs and are specific to the service and participant (s) a service has been provisioned to. The dotted lines reflect the VSC and the mix of dotted lines represent the creation of a VSN. As reflected in the diagram the VSC is end to end and transparent to the physical network path as long as nodes can address one another on a physical network. This allows for embedded and comprehensive security independent of carrier and physical network equipment and owner. The SSGs provide end to end security for each VSC on the VSN. The SSGs can be software and/or hardware based and can run in a community gateway mode or an individual user mode. The physical instance of an SSG is driven by the role (requester, provider, administration) of the participant and the capacity needed at a given gateway. In addition a gateway can be downloaded to a machine or device through a self or automated enrollment process allowing for the rapid addition of users and service providers without impacting any other network participant. At a minimum authentication, authorization, encryption and end to end logging takes place between each and every SSG for every VSC created on the VSN. This allows for end to end reporting, SLA enforcement and privacy for all activity independent of the application or service running over the VSC, and therefore assures a minimum and comprehensive level of security and business reporting for all activity.

EXAMPLE 23

Example Of One Simple Web Services Stack Supported By The Invention

FIG. 22 provides detail around one implementation of the invention where a standards based web services implementation is reflected. In this figure note the layers specific to the web service transport and service stack are independent of the Security and Management layers. This not only assures that all activity will meet a minimum but comprehensive level of security and management reporting, but allows for the implementation of multiple protocol stacks to be implemented by simply switching out XML, SOAP, HTTPs or TCP/IP to meet other communication needs. As examples, SIP, FTP, and others can be easily added to the solution. In addition, security that is specific to one of the horizontal layers (XML, SOAP, HTTPS, etc.,) can be incorporated without impacting the security provided by the rest of the solution or that needed by another service provider on the solution. As an example one service provider might require its own XML certificate process for a web service that it provides and manages. This can be accomplished for that service and independent of other services on the VSN without effecting other service providers. The same would hold for SAML and some of the other security components that are emerging.

EXAMPLE 24

Sample Management Screen For Provisioning

Figure 23:
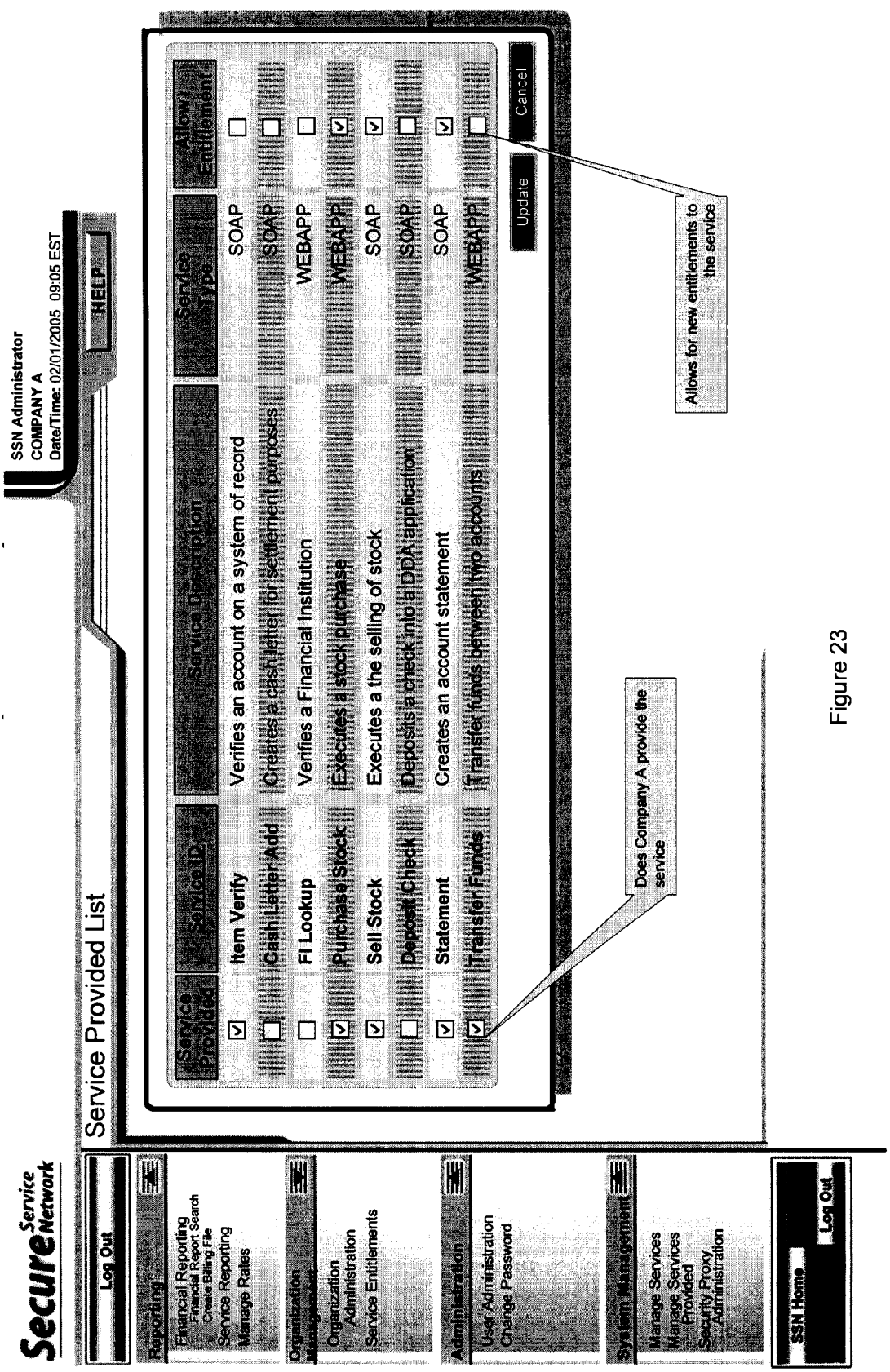
FIG. 23 is a screen shot of a service provided list (an embodiment of the invention).
Figure 25:
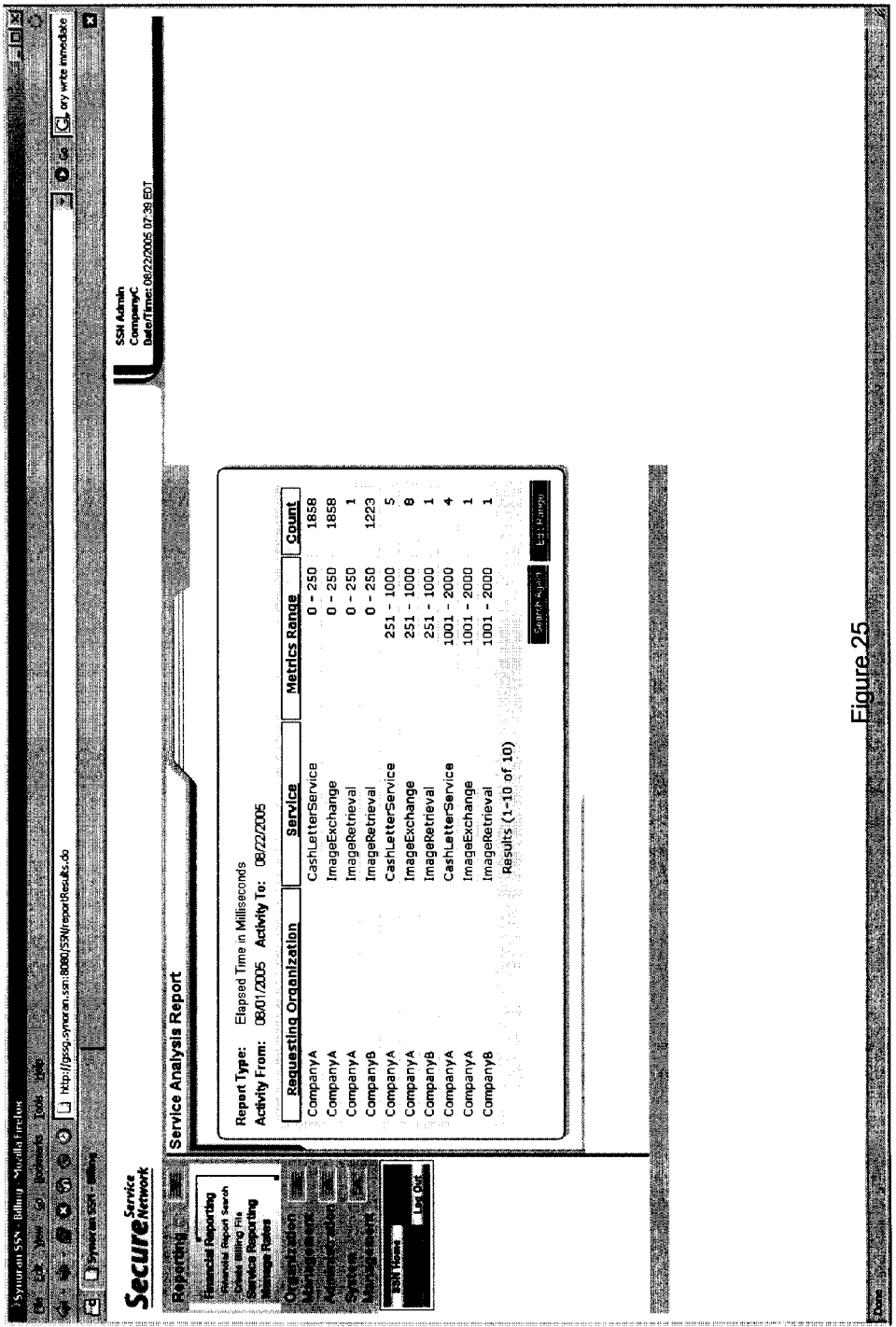
FIG. 25 is a screen shot of a SLA report response time (an embodiment of the invention)
Figure 26:
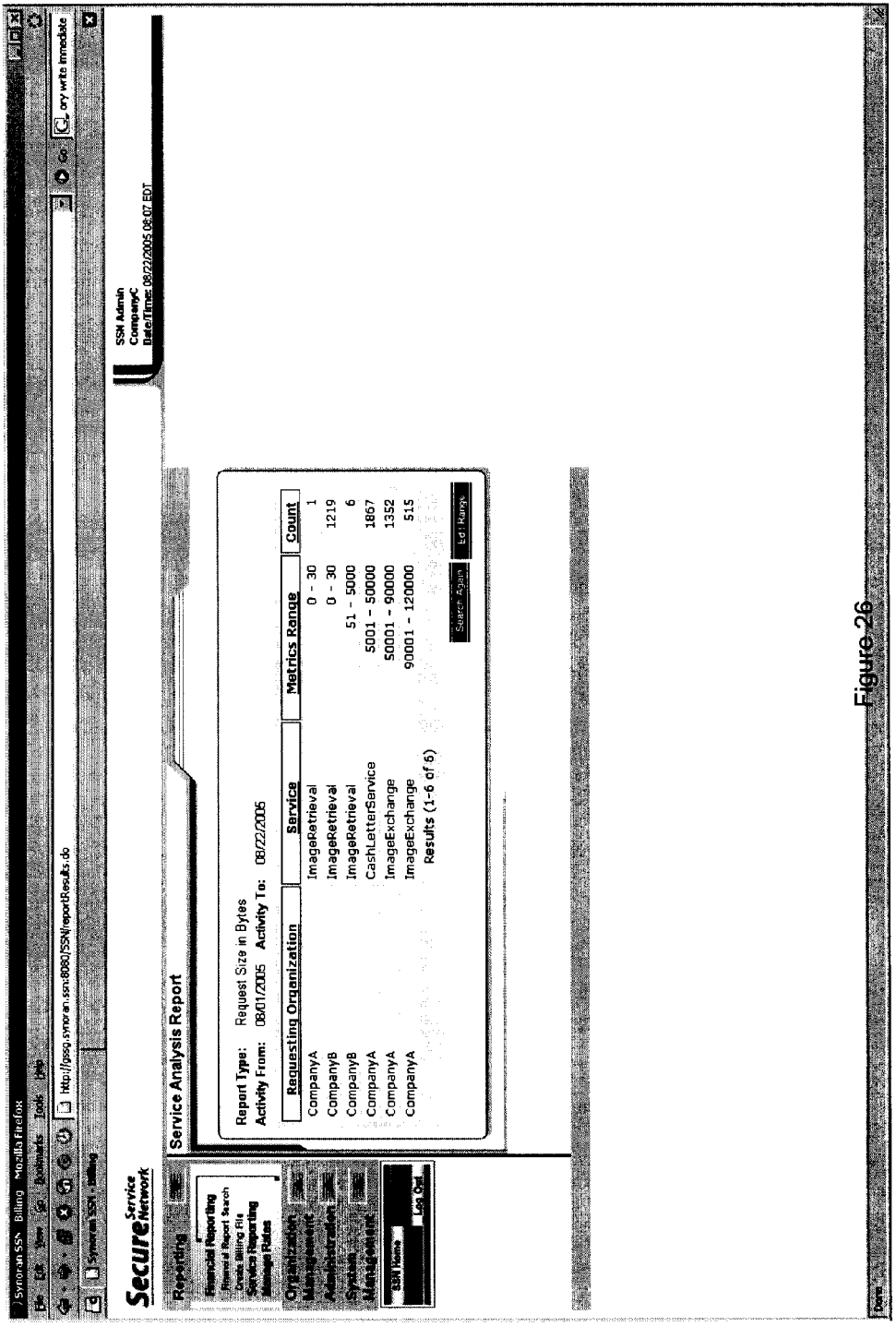
FIG. 26 is a screen shot of a SLA request size record (an embodiment of the invention).
Figure 28:
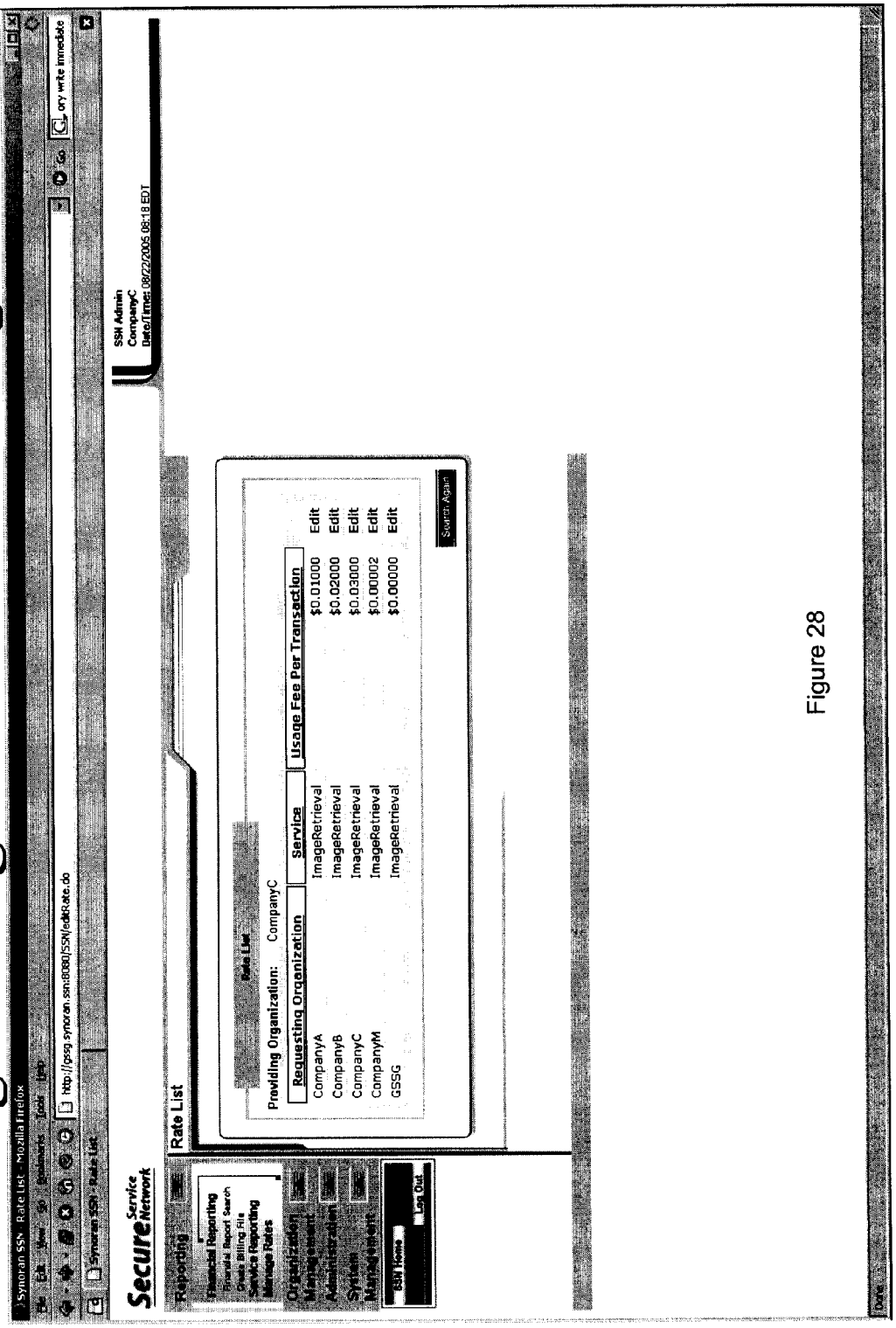
FIG. 28 is a screen shot of a billing/chargeback rate configuration (an embodiment of the invention).

FIG. 23 provides a view of a management facility reflecting all of the services that are available on a specific VSN. From this screen one can see that services can be applications or web services and the provisioning of these items is specific to a service and a participant.

EXAMPLE 25

Sample Log Detail

FIG. 24 provides a view of log records captured for all network traffic. This includes the identity of all participants, the unique request, correlation, and origination IDs and physical network mappings. In addition, response time, error codes and payload specific information is captured and managed independent of the applications communicating over the network.

EXAMPLE 26

Business Reporting

FIGS. 25-29 provides examples of the business reporting provided by the solution of the invention. This includes key Service Level Agreement and business reporting items like response time, payload size, error codes, and usage based billing and rates. This information is private and specific to a service definition and the provisioning of a service to a participant.

EXAMPLE 27

Figure 30:
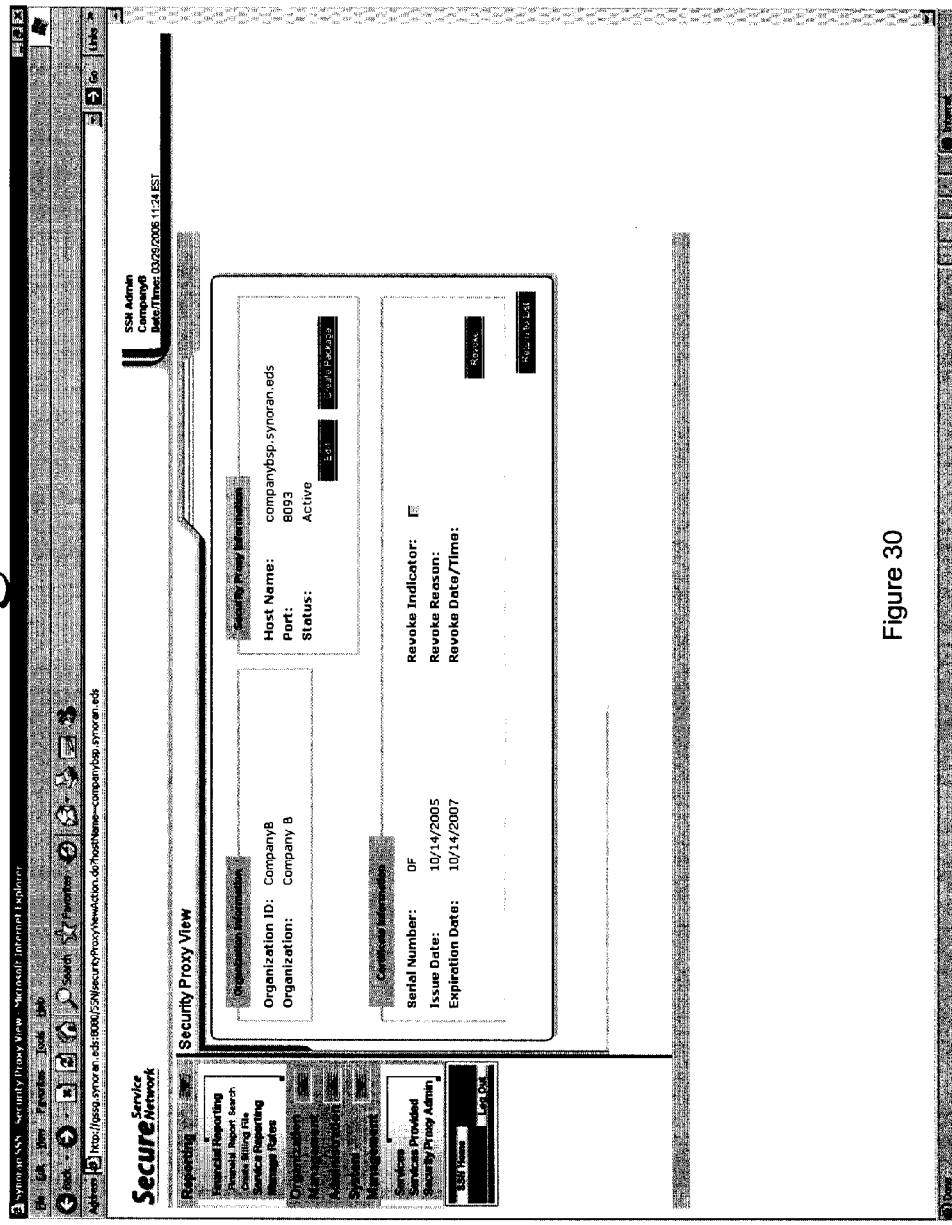
FIG. 30 is an example a screen shot of a PKI lifecycle and an SSG client management record (an embodiment of the invention). client management record.

SSG Client Management With Integrated PKI Lifecycle Management and SSG Package Creation and Provisioning FIG. 30 provides an example of a management screen for the provisioning and creation of a security proxy with embedded PKI management. The identity of the SSG owner, the certificate status (CRL management) and the creation of a Software based SSG package are reflected as functions of the solution. This can be coupled to a service on the SSN where a strong self service authentication process is enabled allowing for the rapid adoption and creation of one or more secure VSN communities over any existing physical network including the internet, using wired or wireless connections.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A method for establishing an end to end secure virtual service network interconnecting at least two computers in multiple physical networks comprising:
   providing a network management layer for administering the secure virtual service connection, the network management layer being located above the physical network transport layer in an Open Systems Interconnect (OSI) stack and connecting the multiple physical networks;
   interconnecting the physical networks with the management layer such that an end to end connection between the computers is effected upon authentication and authorization through a third computer;
   transmitting from a unique user at the first computer to the third computer, a request for a specified high value secure service located at the second computer in a second network, wherein the first computer is located on a first network and operates as a gateway between the first network and a third network;
   authenticating the request at the third computer;
   determining at the third computer an authorization of the unique user at the first computer to access a predetermined service located on the second network;
   verifying the request for the service only if (a) the user is listed on a database of permitted participants maintained in an access control list accessible to that service, and, if the user is listed, allowing access to the requested service, or, if the user is either (i) not listed on the database of permitted participants in the access control list, or (ii) is listed on a database of not permitted participants maintained in a certificate revocation list accessible to the service, denying access of the user to the requested service;
   establishing a secure connection between the first computer and the second computer located on the second network, after the successful authorization of the user at the first computer by the third computer; and
   upon authorization of the user, providing the predetermined service to the user at the first computer from the second computer by way of the secure connection
   the secure connection comprising a secure virtual network connection that traverses the first and second physical networks and establishes a secure end to end connection specific to the service.

2. A method of claim 1 including securing the service running over the transport through the implementation of integrated authentication, authorization, encryption, usage based billing, end to end logging, privacy, and service level activity as a function of a connection on the network and authentication is accomplished by way of the management and provisioning of digital certificates by the third computer.

3. A method of claim 2 including mutual authentication for virtual network connections using a certificate authority and public key encryption.

4. A method of claim 2 including additional authentication accomplished by validating one or more authentication services exposed on the network against one or more credential repositories.

5. A method of claim 1 including the extraction of identities from public key encryption and digital certificates from the third computer for local and/or central authorization control and enforcement.

6. A method of claim 1 including authorization that is centrally enforced, locally enforced, or enforced in a two stage process and local access control list enforcement restricts accesses granted by a central access control list but can not grant access not also present in a central access control list.

7. A method of claim 1 including Secure Sockets Layer encryption coupled to the identity of the user by way of a mutual authentication process using public key encryption and digital certificates.

8. A computer implemented method for creating a secure virtual service network layer within a preexisting digital network connection comprising:
   providing a digital network capable of interconnecting at least one credentialed network participant at a first computer to at least one specified high value secure service at a second computer;
   providing a network management layer for administering the connection, the network management layer being separate from the physical network transport layer in the Open Systems Interconnect (OSI) stack;
   maintaining one or more of: a) an access control list listing the services accessible by the participant, b) a certificate revocation list, c) a logging service, d) a discovery service, and e) a gateway node for the creation of a software package that can be downloaded and registered to the network management layer, in a repository on the network management layer;
   comparing (x) the credential of the participant with credentials required to obtain access to the service, and (y) the participant to the access control list, and authorizing a secure virtual service connection of the participant to the service only if the credential of the participant is listed, the secure virtual service connection specific to the provisioning of the specified service to the participant and denying the connection to the service if the participant is listed on a database of not permitted participants maintained in the certificate revocation list or if the participant is not listed on the database of permitted participants in the access control list;

logging all network activity across all network participants, specific to each secure virtual service connection and the participants to whom the secure virtual service connection is provisioned;

maintaining a discovery service for the identification of available services specific to each participant or activity on the network management layer; correlating each participant's request with criteria for activities allowed on the network as on determined by criteria maintained in the network management layer;

creating a digital certificate for use by participants on the network; signing the certificate for supporting registration and determining the public key encryption lifecycle management associated with participants and nodes on the network management layer; and generating a gateway node for the creation of a software package that can be downloaded and registered to the network management layer.

9. A method in accordance with claim 8 wherein first and second networks are interconnected with a global gateway located on a third network for managing the provisioning, reporting, and implementation of a management layer providing a network management layer above the physical network transport layer in the OSI stack and administering the secure virtual service connection to provide secure communications from a first network to a second network, wherein said global gateway computer includes:
   a. an input for receiving a request for the specified service from the participant at the first computer, wherein the first computer is located in the first network and operates as a gateway between the first network and the third network, and wherein the service is provided by the second network;
   b. a processor for authenticating the request and for determining if the participant at the first computer is authorized to use the service; and
   c. an output for transmitting a message to the first computer that establishes a peer to peer secure connection between the first computer and a second computer upon the successful authentication of the participant at first computer determining that the participant is authorized to use the service, wherein the second computer is located on the second network and operates as a gateway between the second network and the third network.

10. A method of claim 8 including the provisioning of network activity specific to the participants in that activity, in a participant specific virtual network connection, so as to maintain privacy for network activity specific to the participants in that activity through a default security model defined by a "deny all— explicitly grant" rule for network connections.

11. A method of claim 1 further including the provisioning of network activity specific to the users in that activity in a participant specific virtual network connection so as to maintain privacy for network activity specific to the users in that activity through a default security model defined by a "deny all— explicitly grant" rule for network communications.

12. The method of claim 1 including:
   a) providing a software module that establishes a node in the network management layer administering the secure virtual service connection wherein the node is interconnected with first, second and third networks and supports separate and concurrent secure connections with users between and among the first, second and third networks;
   b) a user connection comprising authentication, authorization and encryption for each user connection that is specific to the provisioning of a connection to a specific user on the virtual service connection; and
   c) operating the node as a single user gateway or a gateway for multiple users.

13. The method of claim 8 including correlating a participant's request using GPS information of the participant's location for establishing a spatial reference for activities on the network management layer.

14. The method of claim 1 including correlating a user's request using GPS information of the user's location for establishing a spatial reference for activities on the network management layer.

15. The method of claim 1 including correlating users' requests using GPS information of the users' location for establishing a spatial reference for activities on the network management layer.

16. The method of claim 1 wherein the specified high value secure service is at least one of an application and a web service.

17. The method of claim 16 wherein the service is a health care service.

* * * * *